US010379661B2

(12) United States Patent  
Park et al.

(10) Patent No.: US 10,379,661 B2  
(45) Date of Patent: Aug. 13, 2019

(54) COORDINATE MEASURING APPARATUS AND COORDINATE MEASURING SYSTEM HAVING THE SAME

(71) Applicant: Samsung Electronics Co., Ltd., Suwon-si, Gyeonggi-do (KR)

(72) Inventors: Sung-soo Park, Suwon-si (KR); Byung-hoon Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 174 days.

(21) Appl. No.: 15/271,707

(22) Filed: Sep. 21, 2016

(65) Prior Publication Data

US 2017/0090658 A1    Mar. 30, 2017

Related U.S. Application Data

(60) Provisional application No. 62/232,891, filed on Sep. 25, 2015.

(30) Foreign Application Priority Data

May 19, 2016 (KR) .................. 10-2016-0061368

(51) Int. Cl.
| | |
|---|---|
| *G06F 3/041* | (2006.01) |
| *G06F 3/044* | (2006.01) |
| *G06F 3/0354* | (2013.01) |
| *G06F 3/038* | (2013.01) |

(52) U.S. Cl.
CPC .......... *G06F 3/0416* (2013.01); *G06F 3/0383* (2013.01); *G06F 3/03545* (2013.01); *G06F 3/044* (2013.01); *G06F 2203/04106* (2013.01)

(58) Field of Classification Search
CPC . G06F 2203/04104; G06F 2203/04106; G06F 3/03545; G06F 3/0416; G06F 3/044
See application file for complete search history.

(56) References Cited

U.S. PATENT DOCUMENTS

| | | |
|---|---|---|
| 9,081,425 B2 | 7/2015 | King-Smith et al. |
| 2013/0300712 A1* | 11/2013 | Kim .................. G06F 3/0416 345/174 |
| 2014/0028577 A1 | 1/2014 | Krah et al. |
| 2014/0043279 A1* | 2/2014 | Pedersen .......... G06F 3/0416 345/174 |

(Continued)

FOREIGN PATENT DOCUMENTS

KR    10-2015-0098051 A    8/2015

*Primary Examiner* — Gene W Lee  
(74) *Attorney, Agent, or Firm* — Jefferson IP Law, LLP

(57) ABSTRACT

A coordinate measuring apparatus and a coordinate measuring system are provided. The coordinate measuring apparatus includes a channel electrode circuit including a plurality of electrodes, a driver configured to generate a driving circuit signal and provide the driving signal to the channel electrode circuit, a receiver configured to receive first receiving signal for detecting capacitance change from a portion of the plurality of electrodes, and simultaneously receive second receiving signal corresponding to a signal transmitted from a coordinate indicating apparatus from another portion of the plurality of electrodes, and a processor configured to determine a position of at least one of a hand and the coordinating indicating apparatus based on the received first receiving signal and second receiving signal.

20 Claims, 36 Drawing Sheets

(56) References Cited

U.S. PATENT DOCUMENTS

| | | |
|---|---|---|
| 2015/0062062 A1 | 3/2015 | Han et al. |
| 2015/0084899 A1 | 3/2015 | Park et al. |
| 2015/0234498 A1 | 8/2015 | Cho et al. |
| 2015/0301577 A1* | 10/2015 | Leigh ............... G06F 3/041 345/174 |
| 2016/0266673 A1* | 9/2016 | Dinu ................ G06F 3/044 |
| 2018/0018028 A1* | 1/2018 | Lee ................. G06F 3/044 |

* cited by examiner

COORDINATE MEASURING APPARATUS AND COORDINATE MEASURING SYSTEM HAVING THE SAME

CROSS-REFERENCE TO RELATED APPLICATION(S)

This application claims the benefit under 35 U.S.C. § 119(e) of a U.S. Provisional application filed on Sep. 25, 2015 in the U.S. Patent and Trademark Office and assigned Ser. No. 62/232,891, and under 35 U.S.C. § 119(a) of a Korean patent application filed on May 19, 2016 in the Korean Intellectual Property Office and assigned Serial number 10-2016-0061368, the entire disclosure of each of which is hereby incorporated by reference.

TECHNICAL FIELD

The present disclosure relates to a coordinate measuring apparatus and a coordinate measuring system having the same. More particularly, the present disclosure relates to a coordinate measuring apparatus capable of simultaneously measuring positions of a hand touch of a user and a stylus pen and a coordinate measuring system having the same.

BACKGROUND

The rapid proliferation of smart phones and tablet personal computers (PCs) in recent years has led to active development of the technology for built-in contact position measuring apparatus. The smart phones or the tablet PCs may typically include touch screens, and the user may designate a specific coordinate of the touch screen using a finger or a stylus pen. For example, the user may input a specific signal to a smart phone by designating the specific coordinate of the touch screen.

The touch screens in the related art may detect a hand touch of the user or a contact of the stylus pen, but not both. Methods of detecting both the hand touch of the user and the contact of the stylus pen have been employed in recent years.

However, because the detection of the hand touch and the detection of the stylus pen are performed alternately in the related art, the simultaneous detection of the hand touch and the contact of the stylus pen is not possible.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a coordinate measuring apparatus capable of simultaneously detecting a position of a hand touch of a user and a position of a stylus pen and a coordinate measuring system having the same.

In accordance with an aspect of the present disclosure, a coordinate measuring apparatus is provided. The coordinate measuring apparatus includes a channel electrode circuit including a plurality of electrodes, a driver circuit configured to generate a driving signal and provide the driving signal to the channel electrode circuit, a receiver configured to receive first receiving signal for detecting capacitance change from a portion of the plurality of electrodes, and simultaneously receive second receiving signal corresponding to a signal transmitted from a coordinate indicating apparatus from another portion of the plurality of electrodes, and a processor configured to determine a position of at least one of a hand and the coordinating indicating apparatus based on the received first receiving signal and second receiving signal.

The driver circuit may generate the driving signal having a different frequency band from the second receiving signal and provide the driving signal to the channel electrode circuit.

The channel electrode circuit may include a first electrode group including a plurality of first electrodes arranged in a first direction and a second electrode group including a plurality of second electrodes arranged in a second direction perpendicular to the first direction. The receiver may receive the second receiving signal from the second electrode group while the driver circuit drives the first electrode group to generate the first receiving signal.

The channel electrode circuit may include a first electrode group including a plurality of first electrodes arranged in a first direction and a second electrode group including a plurality of second electrodes arranged in a second direction perpendicular to the first direction. While the driver circuit drives a portion of the plurality of first electrodes in the first electrode group to generate the first receiving signal, the receiver may receive the second receiving signal from another portion of the plurality of first electrodes in the first electrode group.

The first receiving signal and the second receiving signal may be signals having different frequency bands from each other.

The receiver may receive one of the first receiving signal and the second receiving signal in parallel from a group of a plurality of same electrodes of the plurality of electrodes in the channel electrode circuit. The processor may control the receiver to simultaneously receive the first receiving signal and the second receiving signal from both the group of the plurality of same electrodes and a group of a plurality of different electrodes of the plurality of electrodes in the channel electrode circuit.

The processor may calculate capacitance between electrodes at each of a plurality of electrode crossing points using the first receiving signal, determine the position of the hand based on the calculated capacitance, and determine the position of the coordinate indicating apparatus based on a ratio between the received second receiving signals.

The driver circuit may generate a first driving signal for generating the first receiving signal and a second driving signal for generating a signal of the coordinate indicating apparatus approaching the coordinating measuring apparatus through capacitive coupling, and the first driving signal and the second driving signal may be signals having different frequency bands from each other.

The driver circuit may provide the first driving signal and the second driving signal to different electrodes.

The second driving signal may be a signal in which higher-order harmonics of a signal frequency are filtered.

The receiver may include a first receiver configured to receive the first receiving signal for detecting the capacitance change and a second receiver configured to receive the second receiving signal corresponding to the signal transmitted from the coordinate indicating apparatus while the first receiving signal is received.

The second receiver may include an amplifier configured to amplify the received second receiving signal and output an amplified second receiving signal, an analog to digital converter (ADC) configured to convert the amplified second receiving signal to a digital signal, and a signal processor configured to extract a preset frequency component from the converted digital signal.

The second receiver may include a filter configured to perform filtering on a preset frequency band of the received second receiving signal, a signal processor configured to measure a magnitude of the filtered second receiving signal, and extract writing pressure information using a frequency band of the filtered second receiving signal.

In accordance with another aspect of the present disclosure, a coordinate measuring apparatus is provided. The coordinate measuring apparatus includes detecting a contact position of a hand based on capacitance and detect a contact position of a coordinate indicating apparatus configured to generate an electrical signal for measuring the contact position, the coordinate measuring apparatus including a channel electrode circuit including a plurality of electrodes, a driver circuit configured to generate a driving signal and provide the driving signal to the channel electrode circuit, a receiver configured to simultaneously receive first receiving signal for detecting capacitance change and second receiving signal corresponding to the electrical signal generated in the coordinate indicating apparatus from electrodes of the channel electrode circuit, and a processor configured to determine a position of at least one of a hand and the coordinate indicating apparatus based on the first receiving signal and the second receiving signal received from the receiver. The driver circuit may generate a first driving signal for detecting the capacitance change and a second driving signal which is an excitation signal for generating the electrical signal of the coordinate indicating apparatus and apply the first driving signal and the second driving signal to different electrodes.

The first driving signal and the second driving signal may be signals having different frequency bands from each other.

The driver circuit may provide first driving signals having different digital codes according to electrodes.

The driver circuit may filter high-order harmonics of a resonance frequency from the second driving signal to reduce high-frequency noise.

The driver circuit may generate the first driving signal modulated to a predetermined frequency to improve a signal-to-noise ratio.

In accordance with another aspect of the present disclosure, a coordinate measuring system is provided. The coordinate measuring system includes a coordinate measuring apparatus including a plurality of electrodes, and a coordinate indicating apparatus which transmits a response signal to at least one of the plurality of electrodes in the coordinate measuring apparatus. The coordinate measuring apparatus may generate a driving signal for detecting capacitance change between each of two electrodes of the plurality of electrodes that cross each other and the coordinate indicating apparatus may generate the response signal for a preset time in response to the driving signal being detected.

The response signal and the driving signal may be signals having different frequency bands from each other.

The coordinate indicating apparatus may generate the response signal for the preset time after detection of the driving signal is terminated.

The coordinate measuring apparatus may include a first signal receiver configured to receive a first receiving signal for detecting the capacitance change and a second signal receiver configured to receive a second receiving signal for detecting the response signal. The first signal receiver and the second signal receiver may simultaneously receive the first receiving signal and the second receiving signal from different electrodes among the plurality of electrodes.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first", "second", etc. may be used to describe diverse components, but the components are not limited by the terms. The terms are only used to distinguish one component from the others.

In the present application, the terms "include" and "consist of" designate the presence of features, numbers, operations, components, elements, or a combination thereof that are written in the specification, but do not exclude the presence or possibility of addition of one or more other features, numbers, operations, components, elements, or a combination thereof.

In the various embodiments of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

Figure 1:
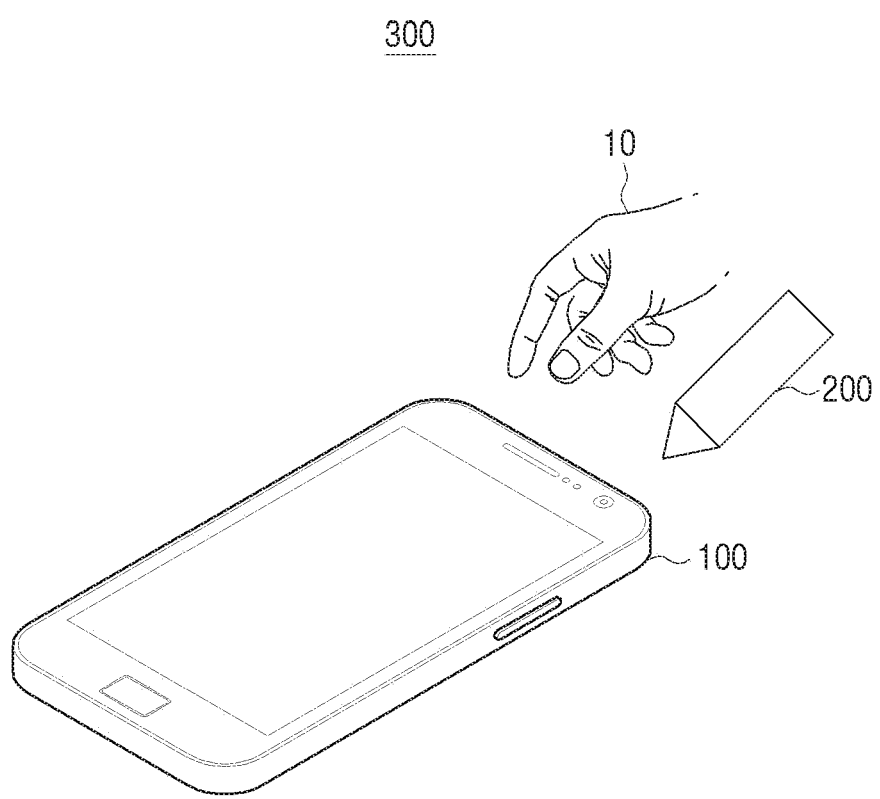
FIG. 1 is a view illustrating a coordinate measuring system according to an embodiment of the present disclosure.

FIG. 1 is a view illustrating a coordinate measuring system according to an embodiment of the present disclosure.

Referring to FIG. 1, a coordinate measuring system 300 may include a coordinate measuring apparatus 100 and a coordinate indicating apparatus 200.

The coordinate measuring apparatus 100 may determine a position of a hand 10 (for example, a finger which is in contact with the coordinate measuring apparatus) of the user. For example, the coordinate measuring apparatus 100 may include a plurality of electrodes, and determine the position of the hand of the user on the coordinate measuring apparatus 100 by applying a driving signal to a portion of the electrodes and measuring a first receiving signal corresponding to the driving signal in the other portion of the electrodes.

The coordinate measuring apparatus 100 may determine a position of the coordinate indicating apparatus 200 in the process of determining the position of the hand. For example, the coordinate measuring apparatus 100 may determine the position of the coordinate indicating apparatus 200 on the coordinate measuring apparatus 100 by receiving a second receiving signal corresponding to a signal of the coordinate indicating apparatus 200.

In response to the coordinate indicating apparatus 200 being an apparatus operating in a passive manner, that is, an apparatus having no power supply therein, the coordinate measuring apparatus 100 may transfer a driving signal to a resonance circuit of the coordinate indicating apparatus 200, which approaches the coordinate measuring apparatus, through capacitive coupling by applying the driving signal to a portion of the plurality of electrodes.

The detailed configuration and operation of the coordinate measuring apparatus 100 will be described later with reference to FIG. 2. For example, the coordinate measuring apparatus 100 may be a touch pad or a touch screen. In another example, the coordinate measuring apparatus 100 may be an electronic apparatus including the touch pad or the touch screen such as a laptop computer, a portable phone, a smart phone, a portable multimedia player (PMP), or a Moving Picture Experts Group phase 1 or phase 2 (MPEG-1 or MPEG-2) audio layer 3 (MP3) player.

The coordinate indicating apparatus 200 may transmit a signal to at least one electrode in the coordinate measuring apparatus 100. The coordinate indicating apparatus 200 may be implemented in a pen form such as a stylus pen, but this is not limited thereto. The coordinate indicating apparatus 200 may be a passive stylus pen which operates using a driving signal provided from an external apparatus as well as an active stylus pen which operates using its own power supply. The detailed configuration and operation of the coordinate indicating apparatus 200 will be described later with reference to FIGS. 20 to 23.

As described above, the coordinate measuring system 300 according to the various embodiments may simultaneously measure the position of the hand and the position of the stylus pen at high speed by simultaneously receiving the first receiving signal for detecting the position of the hand and the second receiving signal for detecting the position of the stylus pen.

It has been described in FIG. 1 that one coordinate indicating apparatus 200 is coupled to the coordinate measuring apparatus 100, but the coordinate measuring system may be implemented in such a manner that a plurality of coordinate indicating apparatuses may be coupled to one coordinate measuring apparatus 100, and the coordinate measuring apparatus 100 may detect positions of the plurality of coordinate indicating apparatuses.

Figure 2:
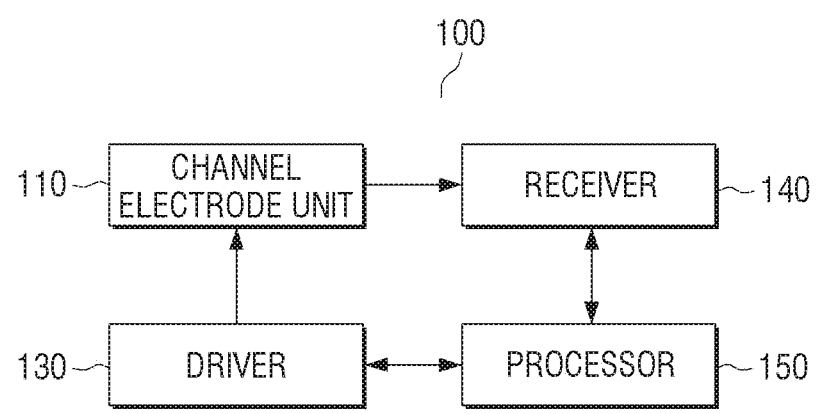
FIG. 2 is a block diagram illustrating a detailed configuration of a coordinate measuring apparatus of FIG. 1 according to an embodiment of the present disclosure.

FIG. 2 is a block diagram illustrating a detailed configuration of the coordinate measuring apparatus of FIG. 1 according to an embodiment of the present disclosure.

Referring to FIG. 2, the coordinate measuring apparatus 100 may include a channel electrode unit 110, a driver 130, a receiver 140, and a processor 150.

The channel electrode unit 110 may include a plurality of electrodes. For example, the channel electrode unit 110 may include the plurality of electrodes arranged in a matrix form. In this example, the channel electrode unit 110 may include a plurality of first electrodes arranged in a first direction and a plurality of second electrodes arranged in a second direction perpendicular to the first direction. The form and operation of the plurality of electrodes included in the channel electrode unit 110 will be described later with reference to FIG. 3.

The driver 130 may generate a driving signal and provide the generated driving signal to the channel electrode unit. For example, the driver 130 may generate a first driving signal for detecting a hand touch and provide the first driving signal to at least one of the electrodes in the channel electrode unit 110. The first driving signal may have a driving frequency in a range of 200 to 300 kHz.

For a faster hand detection operation, the driver may simultaneously provide the driving signal to the plurality of electrodes. In response to the same driving signal being provided to the plurality of electrode, it is impossible to determine whether a response signal received according to the driving signal is corresponding to a driving signal applied to which electrode. Accordingly, the driver 130 may simultaneously provide first driving signal different from each other to the plurality of electrodes. For example, the driver 130 may provide the first driving signals having different digital codes to the plurality of electrodes. The digital code may be a pulse signal having a binary value.

The driver 130 may generate a second driving signal which may be transferred to a resonance circuit of the coordinate indicating apparatus 200 approaching the coordinate measuring apparatus 100 through capacitive coupling. For example, in response to the coordinate indicating apparatus 200 being a stylus pen operating in a passive manner, the driver 130 may transfer a driving signal to a resonance circuit of an object approaching the coordinate measuring apparatus 100 through capacitive coupling by applying the driving signal to the electrodes in the channel electrode unit 110.

The driver 130 may apply the same second driving signal to the electrodes in the channel unit 110 in units of a plurality of electrodes to transfer more energy to the coordinate indicating apparatus 200. The second driving signal may be the signal having a different frequency band from the first driving signal and may have a driving frequency in a range of about 500 kHz to 2 MHz.

For example, the driver 130 may collectively apply the same driving signal to all a plurality of electrodes in a preset period cycle, may collectively apply the same driving signal to all a plurality of electrodes arranged in the same direction, may collectively apply the same driving signal to only adjacent several electrodes among the plurality of electrodes arranged in the same direction, or may collectively apply the same driving signal two electrodes crossing each other. However, the above-described application methods are merely exemplary, and any method of collectively applying the driving signal to two or more electrodes may be employed other than the above-described methods.

The second driving signal may be a signal in which high-order harmonics of a signal frequency (or a resonance frequency) are filtered. For example, generation of undesired noise is regulated in the electromagnetic interference (EMI) standard according to frequency in electronic apparatuses. However, in response to the high-order harmonics being filtered, the high-frequency noise may be reduced, and thus the high-order harmonics filtering may be advantageous in EMI terms.

The receiver 140 may receive first receiving signals for detecting capacitance change from a portion of the plurality of electrodes and simultaneously receive second receiving signals corresponding to a signal transmitted from the coordinate indicating apparatus from the other portion of the plurality of electrodes. For example, the receiver 140 may receive the first receiving signals from a portion of electrodes to which the first driving signal is not applied and the second receiving signals from the other portion of the electrodes to which the first driving signal is not applied. The detailed receiving operation of the receiver 140 will be described in detail with reference to FIGS. 5 to 8.

The processor 150 may determine the position of at least one of the hand and the coordinate indicating apparatus 200 based on the received first receiving signals and second receiving signals. For example, the processor 150 may control the driver to apply the first driving signal to a portion of the plurality of electrodes and control the receiver 140 to receive the first receiving signals from a portion of the remaining electrodes among the plurality of electrodes and the second receiving signals from the other portion of the remaining electrodes in a state that the first driving signal is applied.

The processor 150 may calculate capacitance between electrodes at each of a plurality of electrode crossing points formed between the plurality of electrodes using the first receiving signals and determine the position of the hand based on the calculated capacitance.

The processor 150 may determine the position of the coordinate indicating apparatus 200 based on a ratio between the second receiving signals received from the plurality of electrodes. For example, in response to the plurality of electrodes being configured in a matrix form, a plurality of first electrodes being arranged in a first direction, and a plurality of second electrodes being arranged in a second direction perpendicular to the first direction, the processor 150 may determine a second direction contact position of the coordinate indicating apparatus 200 based on a ratio between the second receiving signals received from the first electrodes and determine a first direction contact position of the coordinate indicating apparatus 200 based on a ratio between the second receiving signals received from the second electrodes.

The processor 150 may detect contact pressure of the coordinate indicating apparatus 200 based on resonance frequency change of the received second receiving signals or detect an operation mode of the coordinate indicating apparatus 200 based on the resonance frequency change of the received second receiving signals.

As described above, the coordinate measuring apparatus 100 according to the various embodiments may simultaneously measure the position of the hand and the position of the stylus pen at high speed by simultaneously receiving the first receiving signals for detecting the position of the hand and the second receiving signals for detecting the position of the stylus pen.

Only the basic configuration of the coordinate measuring apparatus 100 has been illustrated and described, but the coordinate measuring apparatus 100 may further include an additional configuration other than the above-described configuration. For example, in response to the coordinate measuring apparatus 100 being a touch screen, the coordinate measuring apparatus 100 may further include a display configuration. In the other example, the coordinate measuring apparatus 100 being an apparatus such as a smart phone or a PMP player, the coordinate measuring apparatus 100 may further include a configuration such as a display, a storage unit, and a communication unit.

Figure 3:
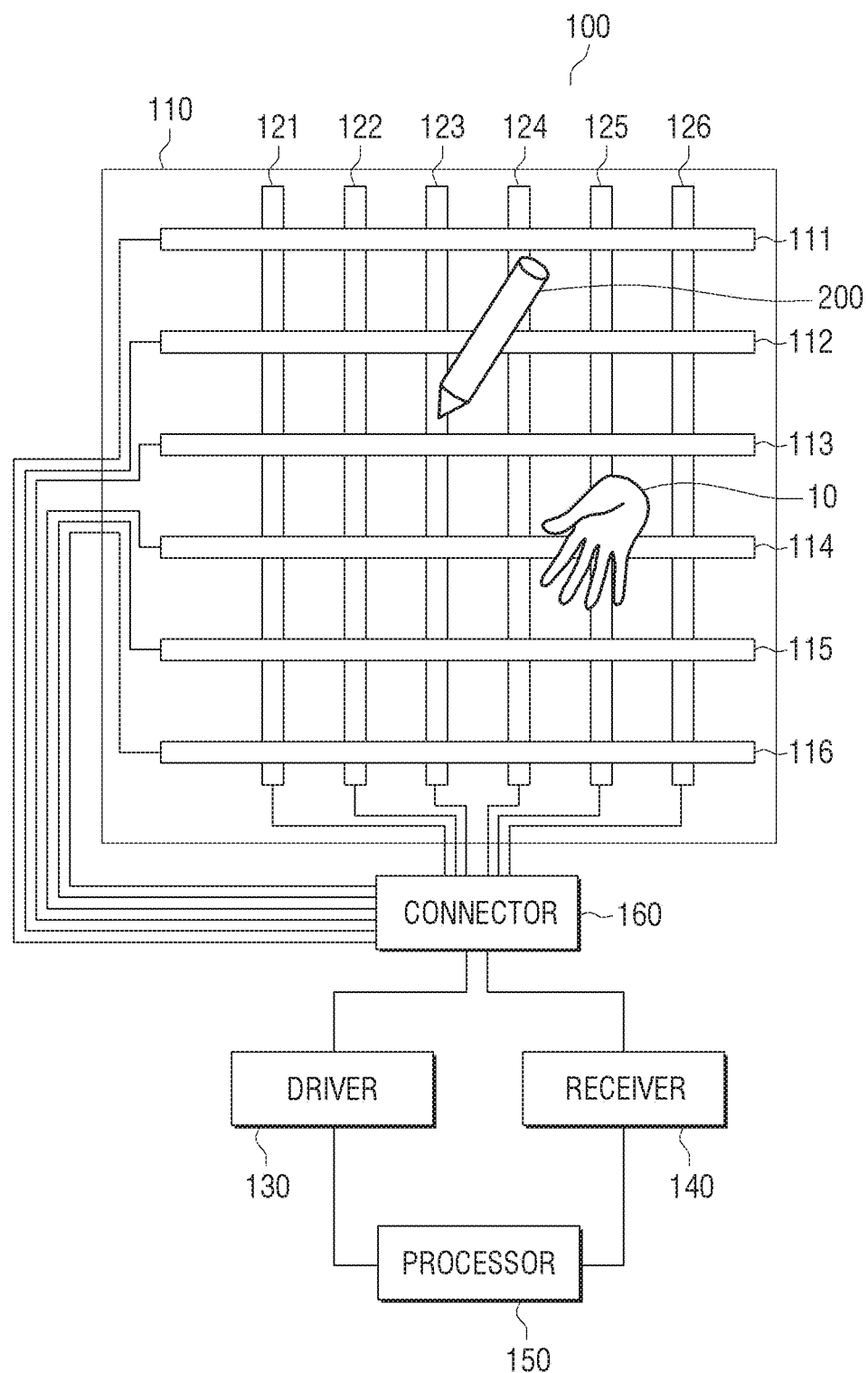
FIG. 3 is a diagram illustrating a circuit of a coordinate measuring apparatus of FIG. 1 according to an embodiment of the present disclosure.

FIG. 3 is a diagram illustrating a circuit of the coordinate measuring apparatus of FIG. 1 according to an embodiment of the present disclosure.

Referring to FIG. 3, the coordinate measuring apparatus 100 may include the channel electrode unit 110, the driver 130, the receiver 140, the processor 150, and a connector 160.

The channel electrode unit 110 may include a plurality of electrodes. For example, as illustrated in FIG. 3, the channel electrode unit 110 may include a first electrode group 111, 112, 113, 114, 115, and 116 and a second electrode group 121, 122, 123, 124, 125, and 126 which are arranged in different directions from each other.

The first electrode group 111 to 116 may include first electrodes 111, 112, 113, 114, 115, and 116 arranged to a first direction (a horizontal direction). The first electrodes 111 to 116 may be formed of an indium tin oxide (ITO) material. A plurality of first electrodes 111 to 116 in the first electrode group 111 to 116 may be electrodes respectively for transmission which transmit the first driving signals in response to the position of the hand 10 being detected.

The second electrode group 121 to 126 may include second electrodes 121, 122, 123, 124, 125, and 126 arranged to a second direction (a vertical direction). The second electrodes 121 to 126 may be formed of an ITO material. A plurality of second electrodes 121 to 126 in the second electrode group 121 to 126 may be electrodes respectively for reception which receive the first receiving signals generated by the first driving signals input to the first electrodes in response to the position of the hand being detected.

It has been illustrated in the various embodiments that each electrode group includes only six electrodes, the channel electrode unit may be implemented to include 7 or more electrodes or to include 5 or less electrodes. It has been illustrated in the various embodiments that the electrodes in the electrode group have a simple rectangular shape, but the channel electrode unit may be implemented to include electrodes having a more complicated shape.

The driver 130 may apply the first driving signal and/or the second driving signal to the channel electrode unit 110 at a preset timing. The detailed operation of the driver 130 has been described in FIG. 2, and thus overlapping description thereof will be omitted.

The receiver 140 may simultaneously receive the first receiving signals and the second receiving signals from different electrodes. For example, the receiver 140 may receive the first receiving signals from the second electrodes in parallel in units of a plurality of channels (for example, in units of three channels) and simultaneously receive the second receiving signals from the first electrodes and the second electrodes in parallel in units of a plurality of channels. The detailed operation of the receiver 140 will be described later with reference to FIG. 4.

The receiver 140 may perform various signal processing on the received first receiving signals and second receiving signals. For example, the receiver 140 may amplify each received signal using an amplifier. This example of the receiver 140 will be described later with reference to FIG. 10.

The connector 160 may selectively couple the electrodes of the channel electrode unit 110 to the driver 130 or the receiver 140. The operation of the connector 160 may be performed through control of the processor 150 to be described. The connector 160 may be operated through control of the driver 130 and the receiver 140. The connector 160 may be implemented using a plurality of switching elements.

The processor 150 may control the driver 130 and the receiver 140 to simultaneously measure the first receiving signals corresponding to the hand detection and the second receiving signals corresponding to the coordinate indicating apparatus 200 so that the detection of the position of the hand and the detection of the position of the coordinate indicating apparatus 200 are simultaneously measured. The processor 150 may be implemented with a central processing unit (CPU), a microprocessor, an application-specific integrated circuit (ASIC), and the like.

For example, in a first time period, the processor 150 may control the driver 130 to apply the first driving signals to a first sub group 111, 112, and 113 of the first electrodes and control the receiver 140 to simultaneously receive the first receiving signals from a portion 121, 122, and 123 of the second electrodes and the second receiving signals from a second sub group 114, 115, and 116 of the first electrodes while the first driving signals are applied. For example, the first driving signals applied to the first electrodes may have different digital code values from each other.

In a second time period, the processor 150 may control the driver 130 to continuously apply the first driving signals to the first sub group 111 to 113 and control the receiver 140 to simultaneously receive the first receiving signals from the other portion 124, 125, and 126 of the second electrodes and the second receiving signals from the portion 121 to 123 of the second electrodes while the first driving signals are applied.

In a third time period, the processor 150 may control the driver 130 to apply the first driving signals to the second sub group 114 to 116 of the first electrodes and control the receiver 140 to simultaneously receive the first receiving signals from the portion 121 to 123 of the second electrodes and the second receiving signals from the other portion 124 to 126 of the second electrodes while the first driving signals are applied.

In a fourth time period, the processor 150 may control the driver 130 to continuously apply the first driving signals to the second sub group 114 to 116 and control the receiver 140 to simultaneously receive the first receiving signals from the other portion 124 to 126 of the second electrodes and the second receiving signals from the first sub group 111 to 113 of the first electrodes while the first driving signals are applied.

Through such an operation, the first receiving signals necessary for the position detection of the hand and the second receiving signals necessary for the position detection of the coordinate indicating apparatus received from all the electrodes may be received.

In response to the first receiving signals with respect to all the second electrodes being received, the processor 150 may calculate capacitances at a plurality of electrode crossing points formed between the first electrodes and the second electrodes, and the processor 150 may determine the position of the hand based on the calculated capacitances.

For example, the processor 150 may calculate capacitances based on change of the first receiving signals received from the second electrodes in the first to fourth time periods and determine a Y coordinate corresponding to the first electrode 114 having the largest change in the calculated capacitances as a Y coordinate of the hand, and may calculate the capacitances based on the change of the first receiving signals and determine an X-coordinate corresponding to the second electrode 125 having the largest change in the calculated capacitances as an X-coordinate of the hand.

In response to the second receiving signals with respect to all the electrodes being received, the processor 150 may determine the position of the coordinate indicating apparatus based on a ratio between the second receiving signals received from the first electrodes 111 to 116 and a ratio between the second receiving signals received from the second electrodes 121 to 126.

For example, in response to a magnitude of the second receiving signal of the first electrode 113 being larger than those of the second receiving signals of the other first electrodes 111, 112, 114 to 116 and a magnitude of a response signal of the second electrode 123 being larger than those of the second receiving signals of the other second electrodes 121, 122, 124 to 126, the processor 150 may determine a second direction contact position of the coordinate indicating apparatus 200 based on the ratio between the second receiving signals received from the first electrodes 112 to 114 and determine a first direction contact position of the coordinate indicating apparatus 200 based on the ratio between the second receiving signals received from the second electrodes 122 to 124.

It has been illustrated and described in FIG. 3 that the plurality of electrodes is arranged in the matrix form, but the plurality of electrodes may be implemented to be arranged in other forms other than the matrix form.

Figure 4:
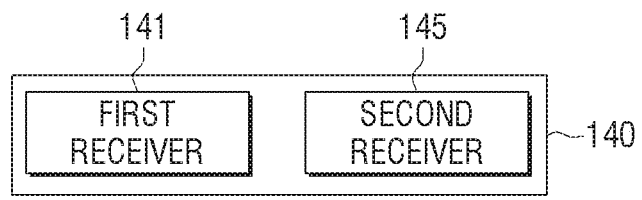
FIG. 4 is a diagram illustrating a detailed configuration of a receiver of FIG. 2 according to an embodiment of the present disclosure.

FIG. 4 is a diagram illustrating a detailed configuration of the receiver of FIG. 2 according to an embodiment of the present disclosure.

Referring to FIG. 4, the receiver 140 may include a first receiver 141 and a second receiver 145.

The first receiver 141 may receive the first receiving signals for hand detection. For example, the first receiver 141 may receive the first receiving signals from the plurality of second electrodes in parallel in units of a plurality of channels. In this example, the first receiver 141 may alternately receive the first receiving signals from a portion 121 to 123 of the second electrodes and the other portion 124 to 126 of the second electrodes. In another example, the first receiver 141 may alternately receive the first receiving signals from a portion 121, 123, and 125 of the second electrodes and the other portion 122, 124, and 126 of the second electrodes. The detailed configuration of the first receiver 141 will be described later with reference to FIG. 9.

The second receiver 145 may receive the second receiving signals for detection of the coordinate indicating apparatus 200. For example, the second receiver 145 may receive the second receiving signals from the pluralities of first and second electrodes. In this example, the second receiver 145 may receive the second receiving signals from electrodes which the first driving signals are not applied thereto and the first receiving signals are not received therefrom. The detailed configuration of the second receiver 145 will be described later with reference to FIG. 10.

FIGS. 5 to 8 are diagrams illustrating an operation of a coordinate measuring apparatus according to various embodiments of the present disclosure. For example, the operation in the first embodiment may be an operation of simultaneously measuring positions of a stylus pen operating in an active manner and the hand.

Figure 5:
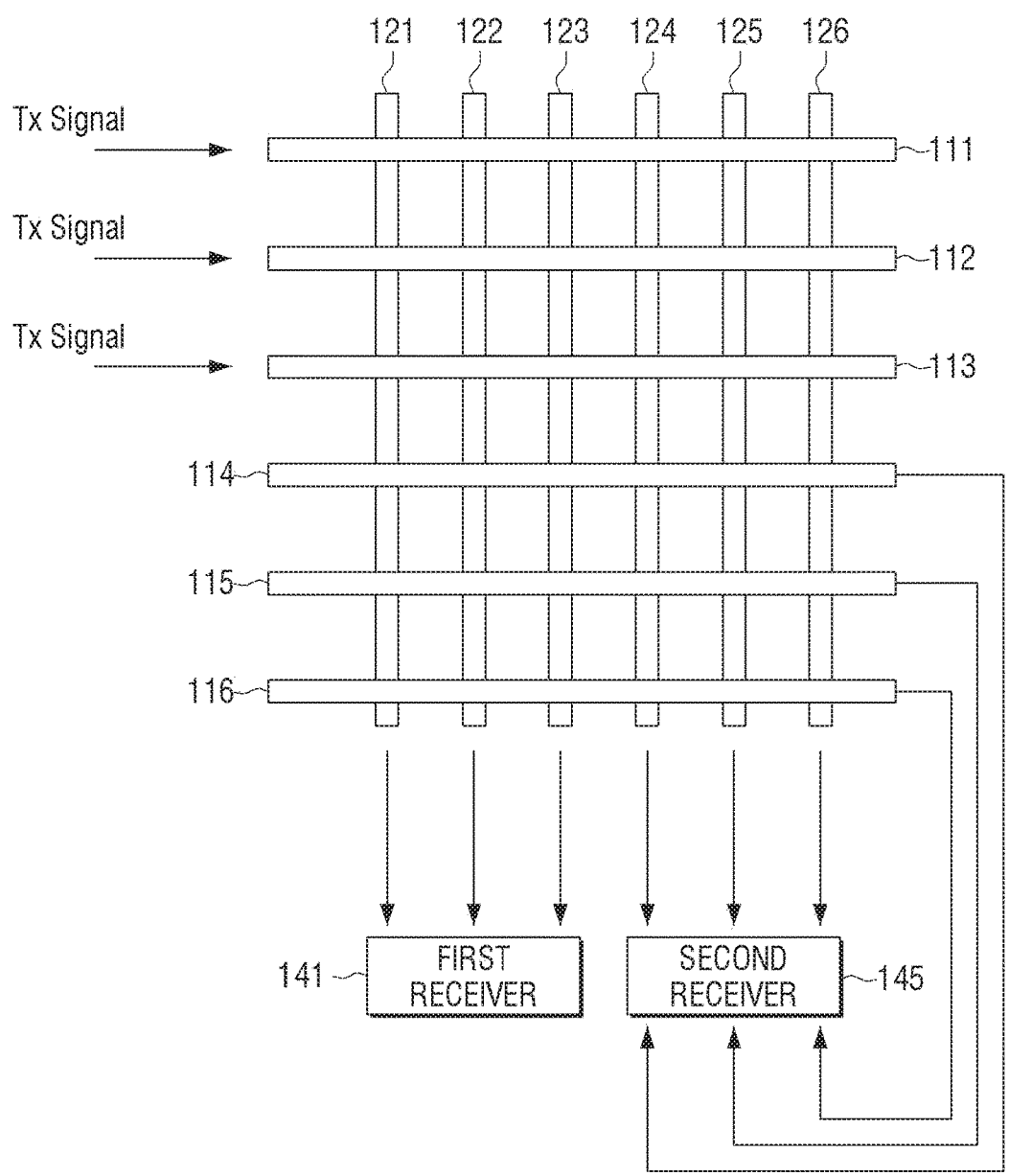
FIGS. 5 to 8 are diagrams illustrating an operation of a coordinate measuring apparatus according to various embodiments of the present disclosure.

Referring to FIG. 5, the first electrode group 111 to 116 may be divided into a plurality of sub groups in units of a plurality of electrodes continuously arranged in parallel. For example, the first electrode group 111 to 116 may be divided into the first sub group 111 to 113 and the second sub group 114 to 116.

In this example, the driver 130 may apply the first driving signals Tx signal to the first sub group 111 to 113 of the first electrode group. For example, the first driving signals applied to the first electrodes may have different digital code values from each other.

The first receiver 141 may receive the first receiving signals from a portion 121 to 123 of the second electrode group in a state that the first driving signals are applied.

At the same time, the second receiver 145 may receive the second receiving signals from the second sub group 114 to 116 of the first electrodes and the other portion 124 to 126 of the second electrodes.

Figure 6:
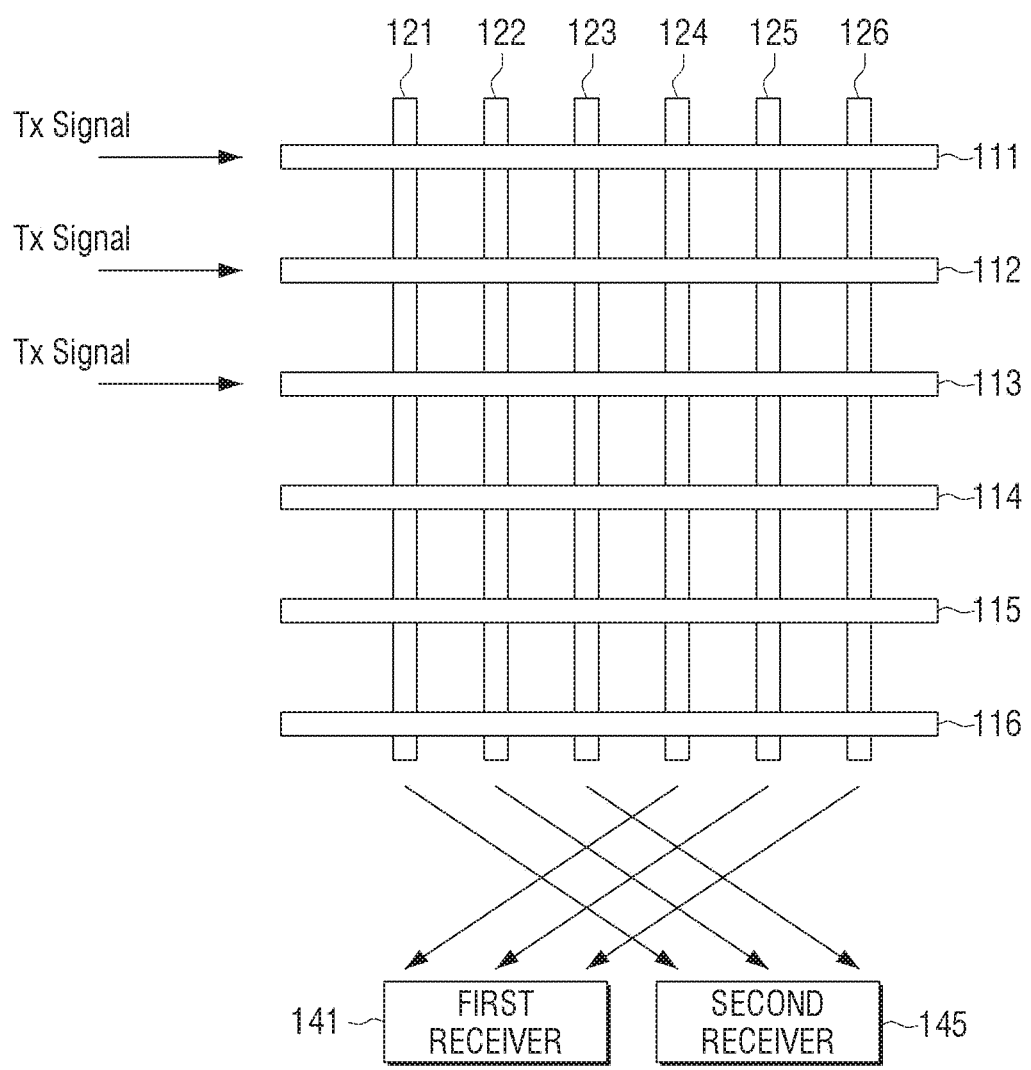

Referring to FIG. 6, the driver 130 may continuously apply the first driving signals to the first sub group 111 to 113.

The first receiver 141 may receive the first receiving signals from the other portion 124 to 126 of the second electrodes while the first driving signals are applied.

The second receiver 145 may receive the second receiving signals from the portion 121 to 123 of the second electrodes.

Figure 7:
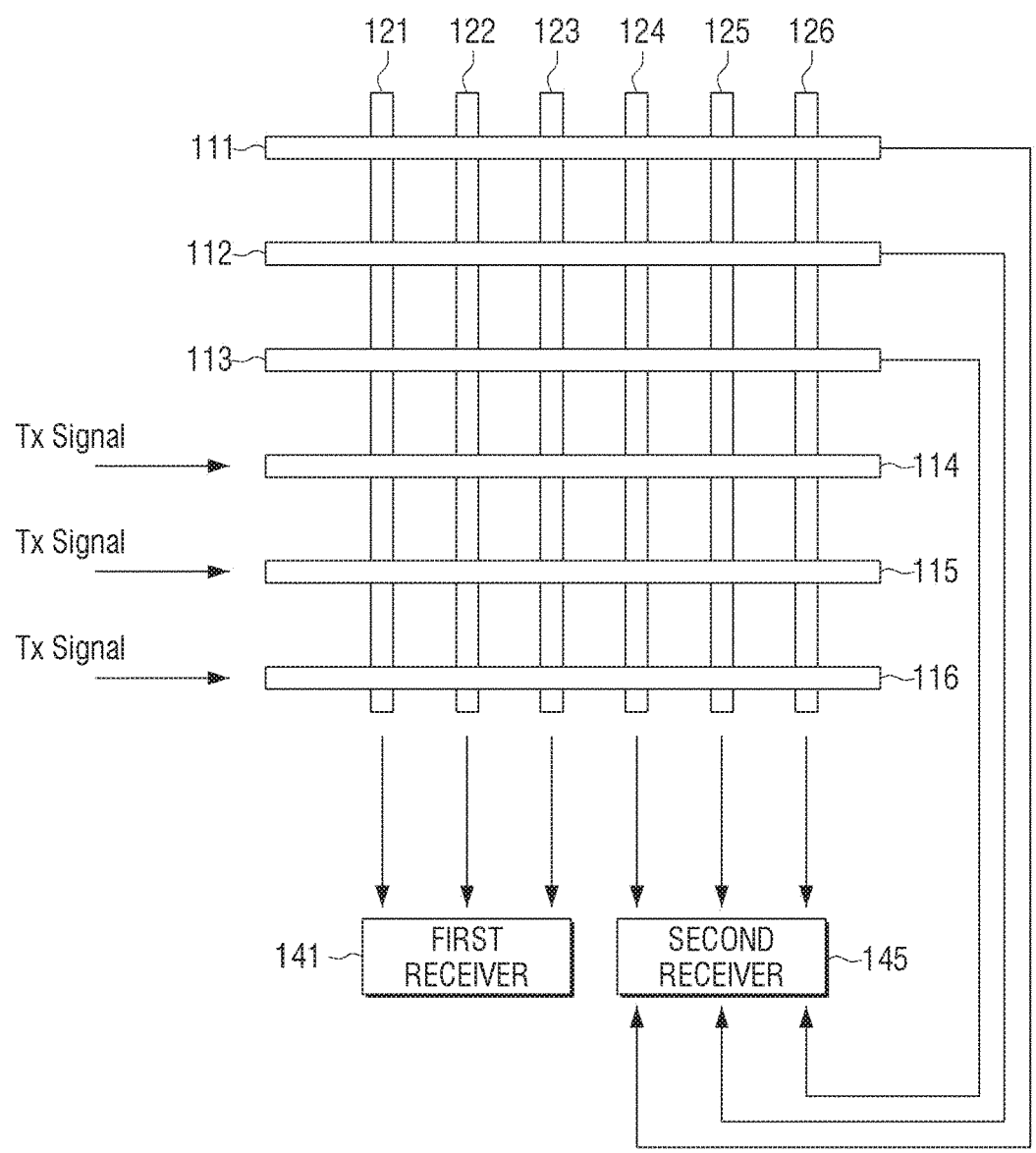

Referring to FIG. 7, the driver 130 may apply the first driving signals to the second sub group 114 to 116 of the first electrodes.

The first receiver 141 may receive the first receiving signals from the portion 121 to 123 of the second electrodes while the first driving signals are applied.

The second receiver 145 may receive the second receiving signals from the other portion 124 to 126 of the second electrodes and the first sub group 111 to 113 of the first electrodes.

Figure 8:
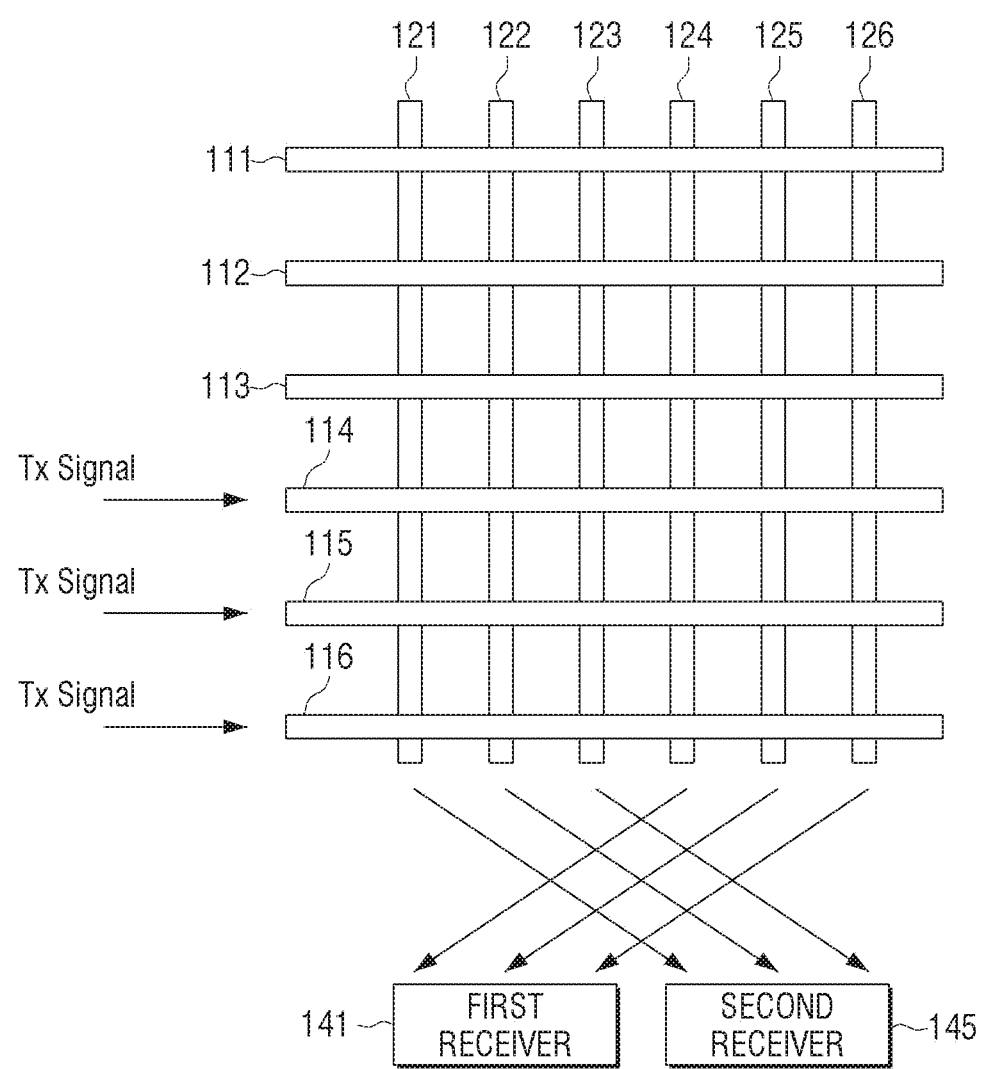

Referring to FIG. 8, the driver 130 may continuously apply the first driving signals to the second sub group 114 to 116 of the first electrodes.

The first receiver 141 may receive the first receiving signals from the other portion 124 to 126 of the second electrodes while the first driving signals are applied.

The second receiver 145 may receive the second receiving signals from the portion 121 to 123 of the second electrodes.

Through the operations as illustrated in FIGS. 5 to 8, the first receiver 141 may receive the first receiving signals with respect to the second electrodes, and the second receiver 145 may receive the second receiving signals with respect to the first electrodes and the second electrodes.

It has been described that the sub groups are previously divided, but the coordinate measuring apparatus may be implemented in such a manner that the sub groups may be dynamically varied. For example, the processor 150 may determine an electrode (for example, the electrode 113) in which a response signal having the largest signal level is received in a previous detection process and electrodes (for example, the electrodes 112 and 114) arranged within a preset distance from the electrode 113 as the sub group to which the driving signals are to be simultaneously input. The process of determining the sub group may be performed in units of one time cycle required for determining the position of the coordinate indicating apparatus.

It has been illustrated and described that the electrodes in each sub group are continuously arranged, but the coordinate measuring apparatus may be implemented in such a manner that the electrodes in the sub groups are alternately arranged. For example, the first electrodes may be divided into a first sub group including the electrodes 111, 113, and 115 and a second sub group including the electrodes 112, 114, and 116.

Figure 9:
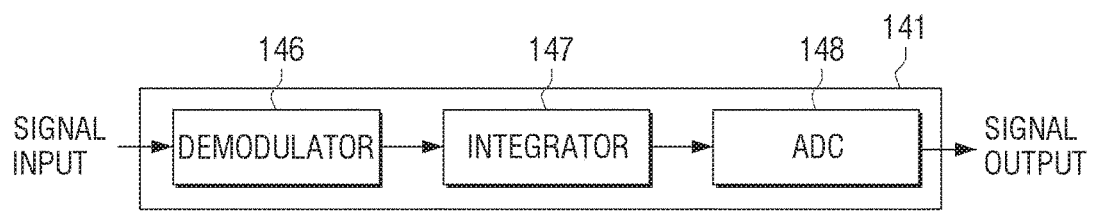
FIG. 9 is a diagram illustrating a detailed configuration of a first receiver of FIG. 4 according to an embodiment of the present disclosure.

FIG. 9 is a diagram illustrating a detailed configuration of a first receiver of FIG. 4 according to an embodiment of the present disclosure.

Referring to FIG. 9, the first receiver 141 may be configured of a demodulator 146, an integrator 147, and an analog to digital converter (ADC) 148.

The demodulator 146 may demodulate the first receiving signal transferred from each electrode and output the demodulated first receiving signal. The driver 130 may generate the first driving signal modulated to a specific frequency or pattern to improve a signal to noise ratio. The demodulator 146 may receive information for the demodulation of the first receiving signal from the processor 150 or the driver 130.

The integrator 147 may accumulate the signal output from the demodulator 146. The high-frequency noise component included in the first receiving signal may be removed through the accumulation process.

The ADC 148 may convert the signal output from the integrator 147 into a digital signal and provide the converted digital signal to the processor 150, and the processor 150 may determine a position of the coordinate measuring apparatus which is touched by the finger based on the transferred information.

It has been illustrated in FIG. 9 that the first receiver 141 includes only one demodulator 146, one integrator 147, and one ADC 148, but the first receiver 141 may be implemented to include a plurality of demodulators, a plurality of integrators, and a plurality of ADCs corresponding to the number of electrodes to be simultaneously processed through the first receiver 141.

Figure 10:
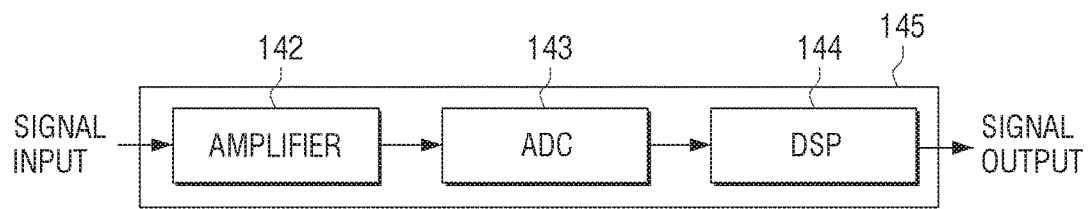
FIG. 10 is a diagram illustrating a detailed configuration of a second receiver of FIG. 4 according to an embodiment of the present disclosure.

FIG. 10 is a diagram illustrating a detailed configuration of a second receiver of FIG. 4 according to an embodiment of the present disclosure.

Referring to FIG. 10, the second receiver 145 may include an amplifier 142, an ADC 143, and a signal processor (or a digital signal processor (DSP)) 144.

The amplifier 142 may amplify the second receiving signal transferred from each electrode and output the amplified second receiving signal.

The ADC 143 may convert the amplified second receiving signal to a digital signal.

The signal processor 144 may extract a magnitude and a frequency component of the second receiving signal converted into the digital signal through a method such as Fourier transform. The processor 150 may determine a contact position of the coordinate indicating apparatus 200 on the coordinate measuring apparatus using the extracted magnitude and frequency component of the second receiving signal. In response to the frequency of the second receiving signal being changed according to contact pressure of the coordinate indicating apparatus 200, the processor 150 may determine the contact pressure of the coordinate indicating apparatus 200.

As described above, in response to the signal being received from the electrode, noise together with the desired signal may be received. To effectively remove the noise, only the frequency component corresponding to a frequency domain of the second receiving signal may be extracted using the signal processor 144 in the embodiment.

The second receiver 145 may remove the noise component by extracting only a reset frequency component and thus receiving sensitivity of the response signal may be improved.

It has been illustrated in FIG. 10 that the second receiver 145 includes only one amplifier 142, one ADC 143, and one digital signal processor (DSP) 144, but the second receiver 145 may be implemented to include a plurality of amplifiers, a plurality of ADCs, and a plurality of signal processors corresponding to the number of electrodes to be simultaneously processed through the second receiver 145.

In response to a magnitude of the input noise being large, a separate analog filter may be further included in front or rear of the amplifier 142 or in the inside of the amplifier 142, and the second receiver 145 may reduce the magnitude of the noise through the separate analog filter.

Figure 11:
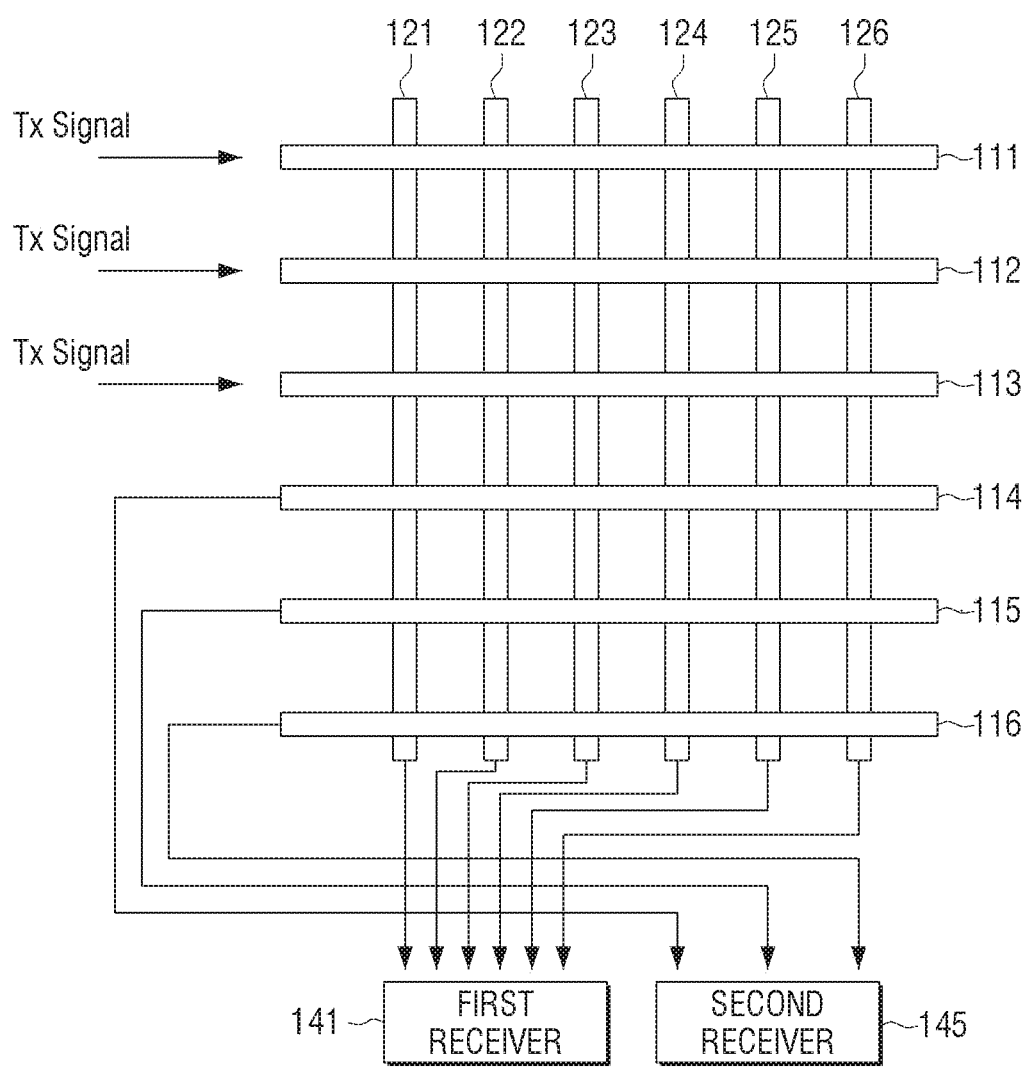
FIGS. 11 and 12 are diagrams illustrating an operation of a coordinate measuring apparatus according to various embodiments of the present disclosure.
Figure 12:
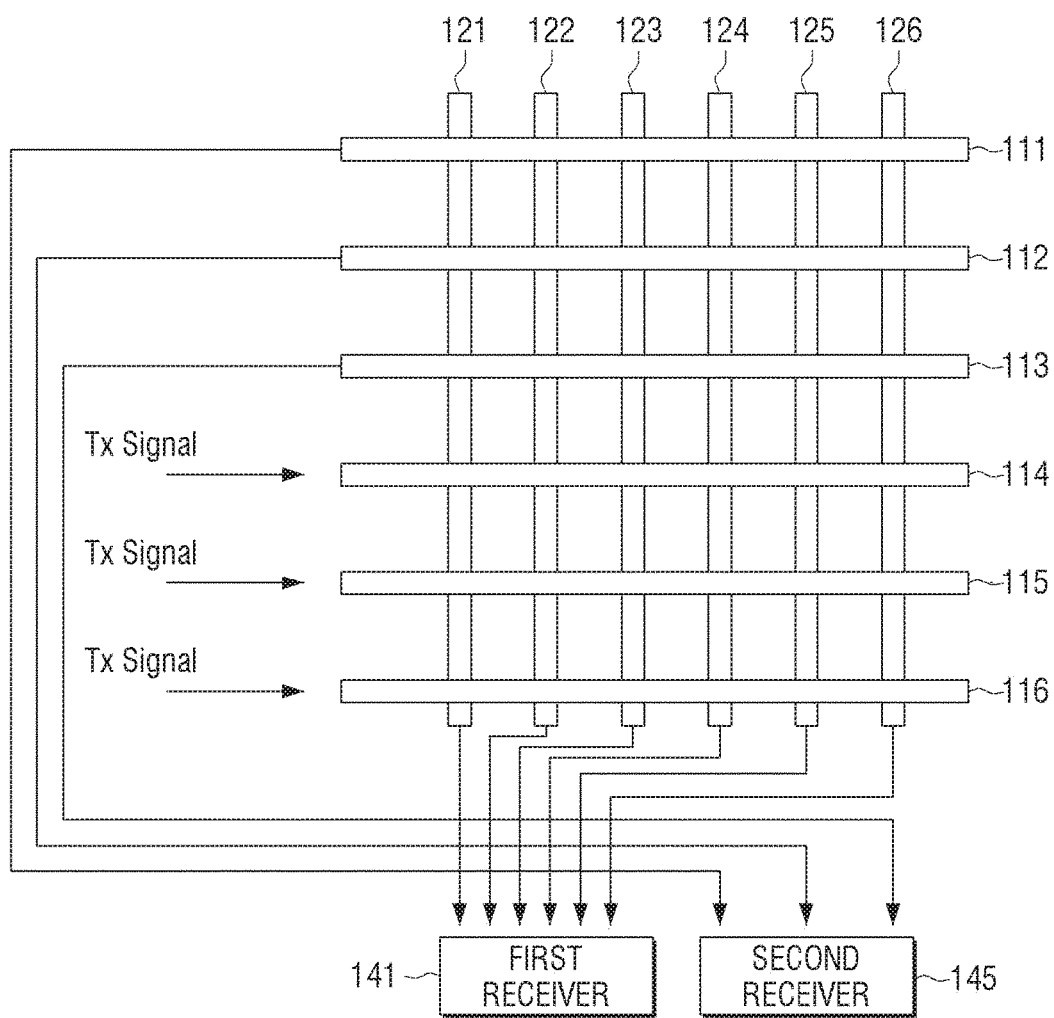

FIGS. 11 and 12 are diagrams illustrating an operation of a coordinate measuring apparatus according to various embodiments of the present disclosure. The operation in the second embodiment is an operation of simultaneously measuring positions of an active stylus pen and the hand in a global scanning process. For example, the operation of the coordinate measuring apparatus 100 may be divided into two stages, that is, the global scanning process of determining whether or not the pen is in contact with the coordinate indicating apparatus 100 and a local scan process of scanning the periphery of the pen. The processes of the first and second embodiments of which portions are omitted may be applied in the local scanning process.

Referring to FIG. 11, the driver 130 may apply the first driving signals Tx signal to the first sub group 111 to 113 of the first electrodes. For example, the first driving signals applied to the first electrodes may have different digital code values from each other.

The first receiver 141 may receive the first receiving signals from all the second electrodes 121 to 126 in a state that the first driving signals are applied.

At the same time, the second receiver 145 may receive the second receiving signals from the second sub group 114 to 116 of the first electrodes.

Referring to FIG. 12, the driver 130 may apply the first driving signals Tx signal to the second sub group 114 to 116 of the first electrodes.

The first receiver 141 may receive the first receiving signals from all the second electrodes 121 to 126 in a state that the first driving signals are applied.

At the same time, the second receiver 145 may receive the second receiving signals from the first sub group 111 to 113 of the first electrodes.

Through such an operation, the processor 150 may determine the position of the hand and determine whether or not the contact of the coordinate indicating apparatus is presented.

FIGS. 13 to 16 are diagrams illustrating an operation of a coordinate measuring apparatus according to various embodiments of the present disclosure. The operation in the third embodiment may be an operation of simultaneously receiving the second receiving signals from the first electrodes and the second electrodes in the second receiver 145.

Figure 13:
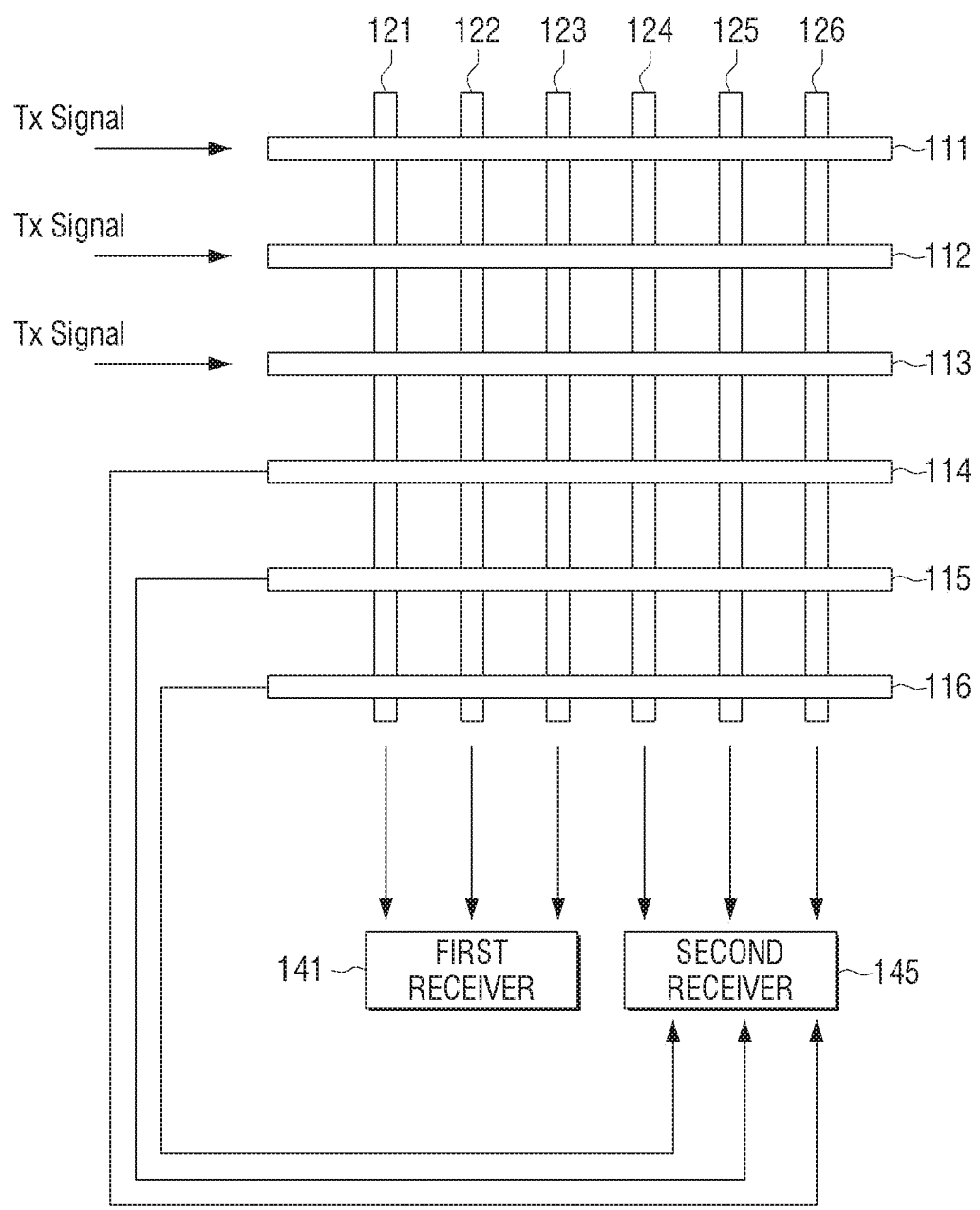
FIGS. 13 to 16 are diagrams illustrating an operation of a coordinate measuring apparatus according to various embodiments of the present disclosure.

Referring to FIG. 13, the driver 130 may apply the first driving signals Tx signal to the first sub group 111 to 113 of the first electrodes. For example, the first driving signals applied to the first electrodes may have different digital code values from each other.

The first receiver 141 may receive the first receiving signals from a portion 121 to 123 of the second electrodes in a state that the first driving signals are applied.

At the same time, the second receiver 145 may receive the second receiving signals from the second sub group 114 to 116 of the first electrodes and the other portion 124 to 126 of the second electrodes.

Figure 14:
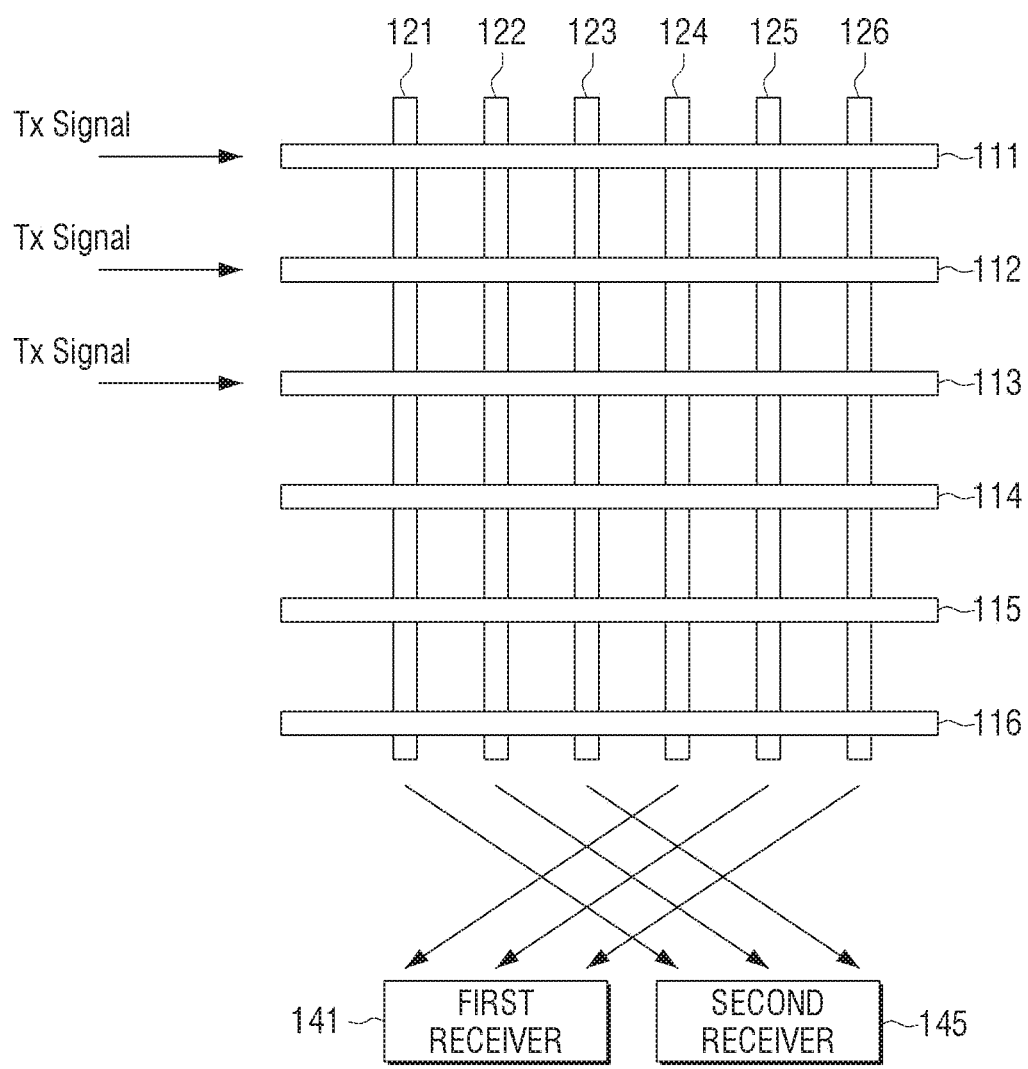

Referring to FIG. 14, the driver 130 may continuously apply the first driving signals to the first sub group 111 to 113.

The first receiver 141 may receive the first receiving signals from the other portion 124 to 126 of the second electrodes while the first driving signals are applied.

At the same time, the second receiver 145 may receive the second receiving signals from the portion 121 to 123 of the second electrodes.

Figure 15:
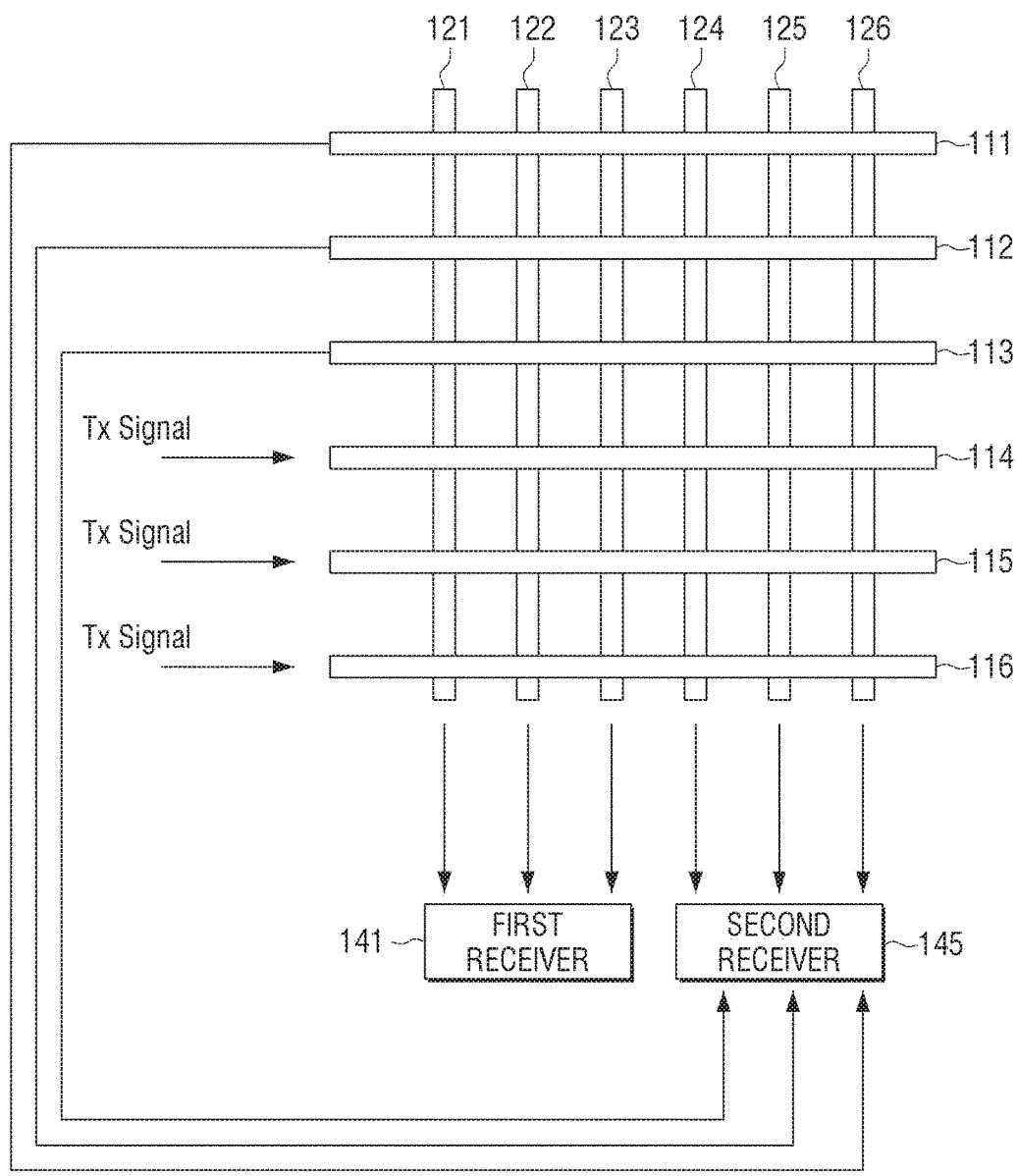

Referring to FIG. 15, the driver 130 may apply the first driving signals Tx signal to the second sub group 114 to 116 of the first electrodes.

The first receiver 141 may receive the first receiving signals from the portion 121 to 123 of the second electrodes while the first driving signals are applied.

At the same time, the second receiver 145 may receive the second receiving signals from the other portion 124 to 126 of the second electrodes and the first sub group 111 to 113 of the first electrodes.

Figure 16:
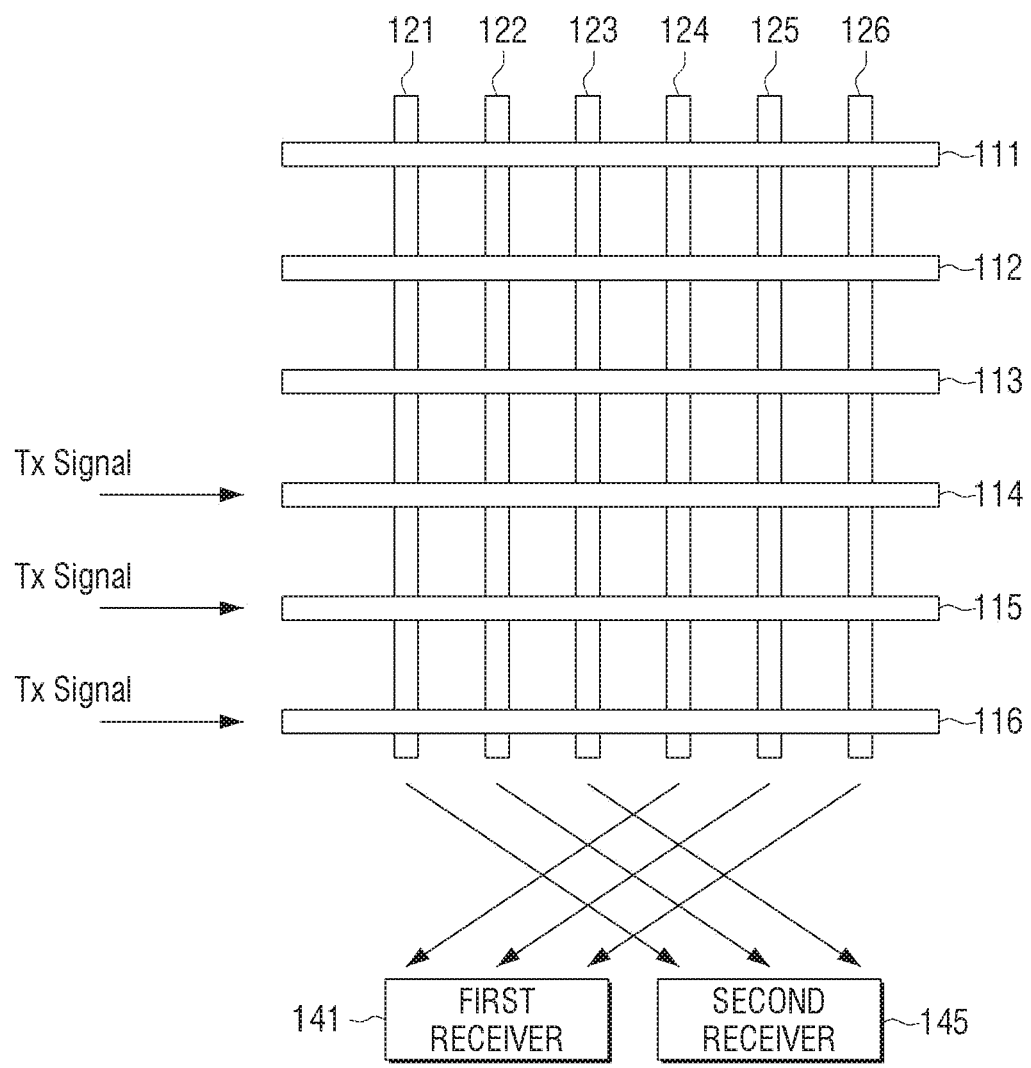

Referring to FIG. 16, the driver 130 may continuously apply the first driving signals to the second sub group 114 to 116 of the first electrodes.

The first receiver 141 may receive the first receiving signals from the other portion 124 to 126 of the second electrodes while the first driving signals are applied.

At the same time, the second receiver 145 may receive the second receiving signals from the portion 121 to 123 of the second electrodes.

Through the operations described in FIGS. 13 to 16, the first receiver 141 may receive the first receiving signals with respect to all the second electrodes and the second receiver 145 may receive the second receiving signals with respect to the first electrodes and the second electrodes.

Figure 17:
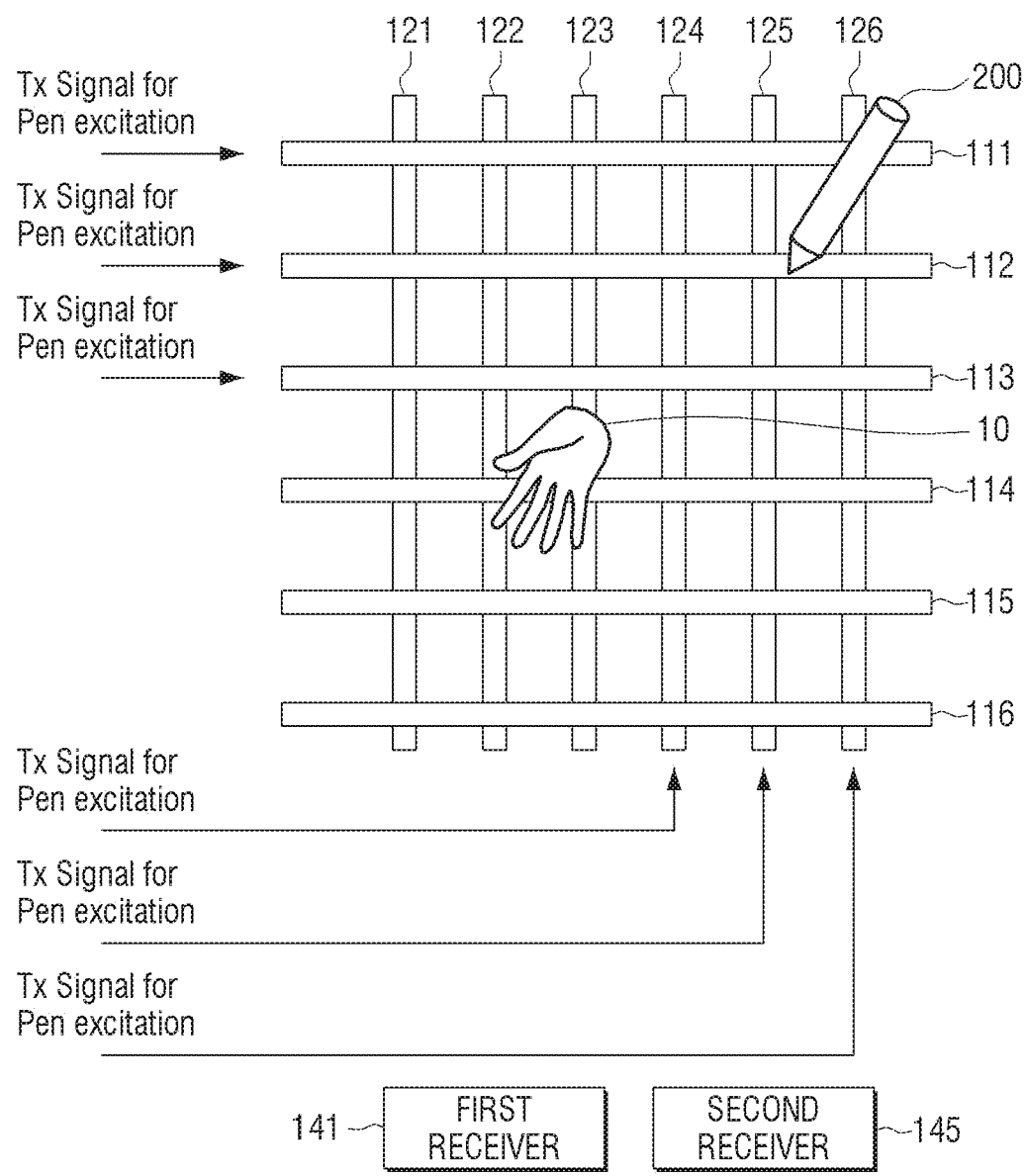
FIGS. 17 to 19 are diagrams illustrating an operation of a coordinate measuring apparatus according to various embodiments of the present disclosure.
Figure 18:
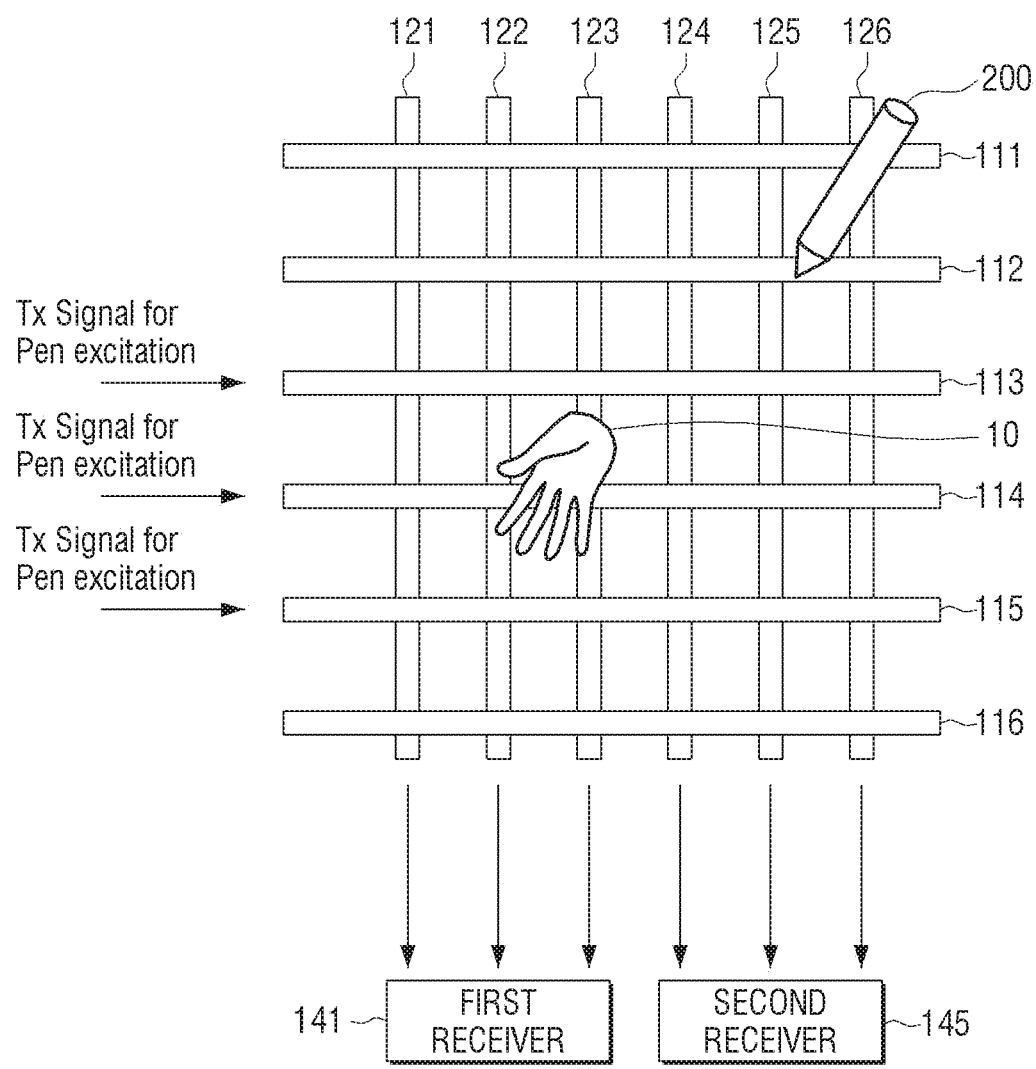
Figure 19:
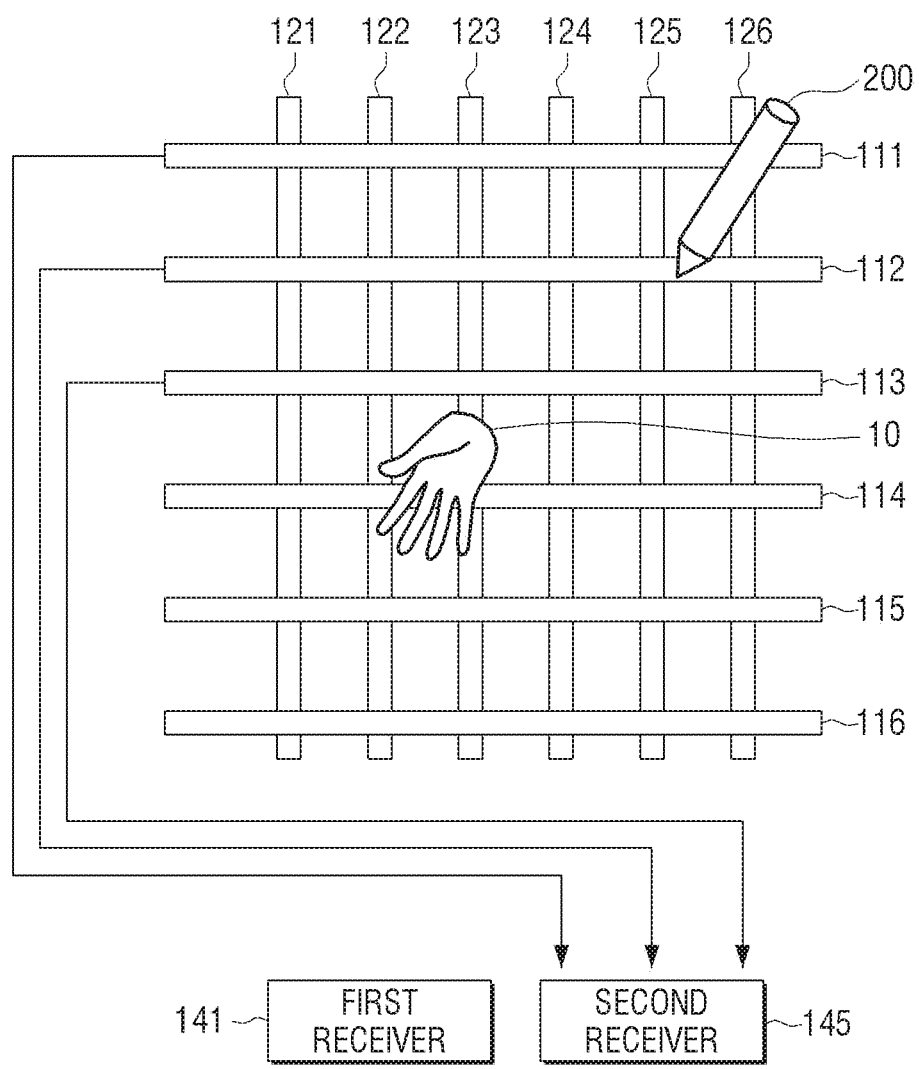

FIGS. 17 to 19 are diagrams illustrating an operation of a coordinate measuring apparatus according to various embodiments of the present disclosure. The operation in the fourth embodiment may be an operation of simultaneously measuring positions of a stylus pen operating in a passive manner and the hand. The operation in the fourth embodiment will be described under the assumption that the coordinate measuring apparatus 100 has understood the position of the hand and the position of the stylus pen through the previous detection process.

Referring to FIG. 17, to receive a response signal from the stylus pen operating in a passive manner, it is necessary to transfer the driving signal to the electrode in advance. Accordingly, the driver 130 may generate second driving signals and apply the second driving signals to the plurality of electrodes 111 to 113 and 124 to 126. It has been illustrated in the various embodiments that the second driving signals are applied to only six electrodes, the coordinate measuring apparatus may be implemented to apply the second driving signals to all the electrodes, to apply the second driving signals to only all the first electrodes, or to apply the second driving signals to only all the second electrodes.

The first receiver 141 and the second receiver 145 may not receive a signal in the process of applying the second driving signals.

To minimize signal interference between the second driving signal for excitation of the passive coordinate indicating apparatus and the first driving signal for capacitive sensing, the first driving signal and the second driving signal may have different driving frequencies from each other.

In the resonance passive pen, a signal which is generated in the pen by receiving energy from a touch panel may be a sinusoidal signal as a resonance signal. Accordingly, in the coordinate measuring apparatus, only a signal of the transferred second driving signals which has frequency close to the resonance frequency may excite the resonance circuit of the pen.

Accordingly, a signal in which high-order harmonics of the resonance frequency are removed may be efficient as the second driving signal (that is, the pen excitation signal).

The generation of undesired noise is regulated in the EMI standard according to frequency in electronic apparatuses. In response to the high-order harmonics being removed, the high-frequency noise is reduced, and thus the high-order harmonics filtering may be advantageous in EMI terms.

In general, the second driving signal for excitation of the passive stylus pen may have a frequency of several MHz or less. However, for example, in response to many high-order terms being presented, unnecessary noise is likely to be generated even in the frequency of 30 MHz or more which is defined in the EMI standard. In this example, the generation of the noise may be prevented by employing a low pass filter.

Referring to FIG. 18, the driver 130 may apply the first driving signals Tx signal to only a portion 113 to 115 of the first electrodes corresponding to the position of the hand according to the previously detected position of the hand. For example, the first driving signals applied to the first electrodes may have different digital code values from each other.

The first receiver 141 may receive the first receiving signals from the portion 121 to 123 of the second electrodes in a state that the first driving signals are applied.

At the same time, the second receiver 145 may receive the second receiving signals from the other portion 124 to 126 of the second electrodes.

Referring to FIG. 19, the second receiver 145 may receive the second receiving signals from the portion 111 to 113 of the first electrodes.

The coordinate measuring apparatus may fast measure the position of the hand and the position of the coordinate indicating apparatus through only the two divided operations other than the application operation of the second driving signal in the fourth embodiment.

Figure 20:
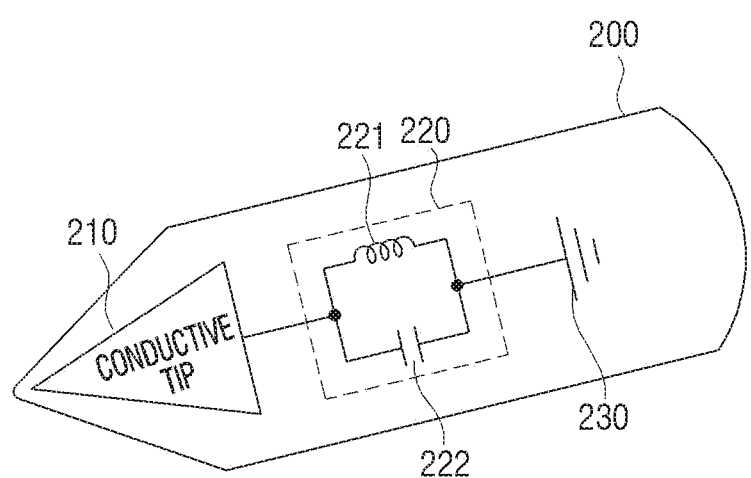
FIG. 20 is a diagram illustrating a detailed configuration of a passive coordinate indicating apparatus according to an embodiment of the present disclosure.

FIG. 20 is a diagram illustrating a detailed configuration of a passive coordinate indicating apparatus according to an embodiment of the present disclosure.

Referring to FIG. 20, the coordinating indicating apparatus 200 may include a conductive tip 210, a resonance circuit 220, and a ground unit 230. For example, the coordinate indicating apparatus 200 may be implemented, for example, in a pen form.

The conductive tip 210 (or a transmission electrode) may form capacitance with at least one electrode among a plurality of electrodes in the coordinate measuring apparatus 100. The conductive tip 110 may be formed of, for example, a metallic tip. The conductive tip 210 may be formed in the inside of a non-conductive material or a portion of the conductive tip 210 may be exposed from the outside. The coordinate indicating apparatus may further include an insulating member which prevents the direct contact of the conductive tip 210 with the outside to smooth the sense of handwriting in response to the coordinating indicating apparatus being used.

The resonance circuit 220 may include a parallel connection circuit having an inductor 221 and a capacitor 222 coupled to the conductive tip 210.

The resonance circuit 220 may receive energy for resonance through capacitive coupling between the at least one electrode in the coordinate measuring apparatus 100 and the conductive tip. For example, the resonance circuit 220 may be resonant with the driving signal input from the coordinate measuring apparatus 100. The resonance circuit 220 may further output the resonance signal by the resonance for a preset time even after the input of the driving signal is interrupted. For example, the resonance circuit 220 may output a sine wave signal having a resonance frequency of the resonance circuit 220.

The capacitance of the capacitor 222 or the inductance of the inductor 221 in the resonance circuit 220 may be varied according to the contact pressure of the conductive tip, and thus the resonance frequency of the resonance circuit 220 may be varied.

The capacitance of the capacitor or the inductance of the inductor in the resonance circuit 220 may be varied according to the operation of the user, and thus the resonance frequency of the resonance circuit 220 may be varied.

Figure 21:
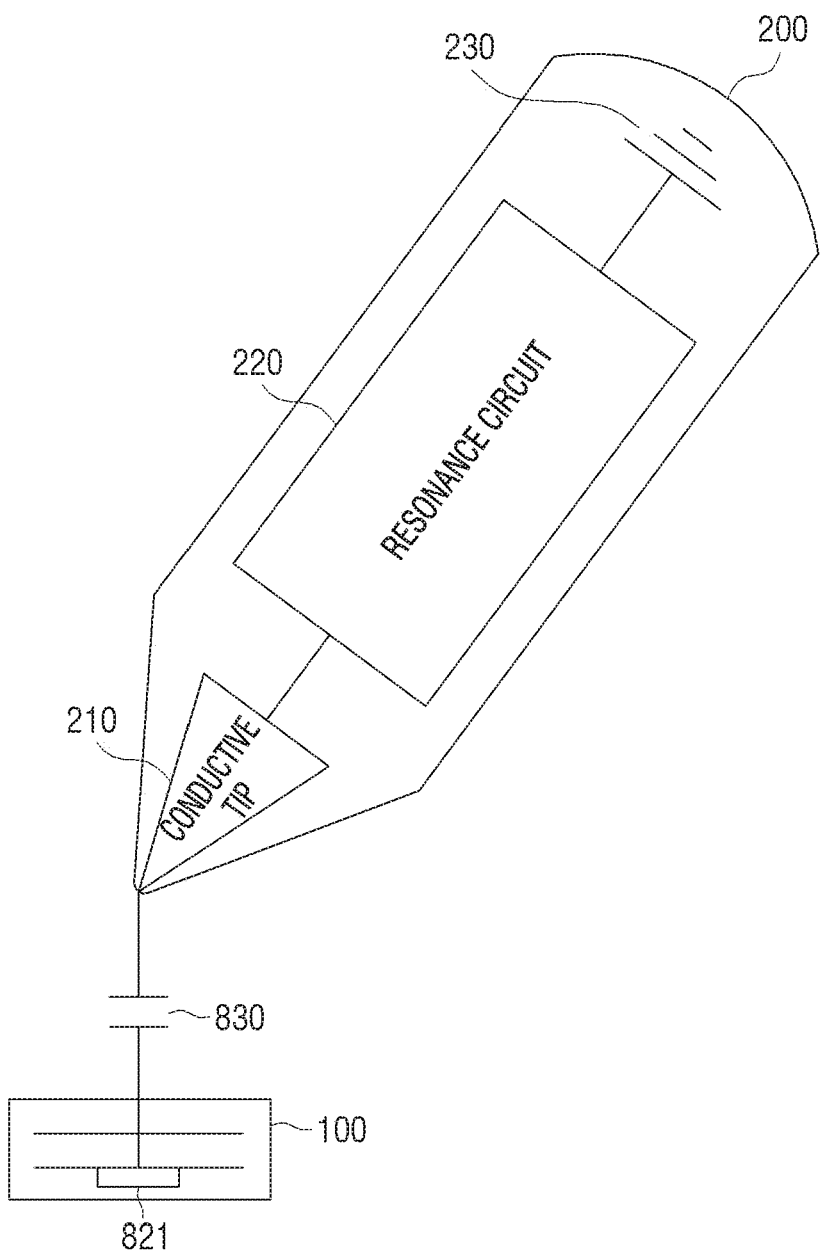
FIG. 21 is a diagram illustrating a circuit of a coordinate indicating apparatus of FIG. 20 in response to a coordinate indicating apparatus being in contact with a coordinate measuring apparatus according to an embodiment of the present disclosure.

FIG. 21 is diagram illustrating a circuit of a coordinating indicating apparatus of FIG. 20 in response to a coordinate indicating apparatus being in contact with a coordinating measuring apparatus according to an embodiment of the present disclosure.

Referring to FIG. 21, the passive coordinate indicating apparatus 200 may receive the energy for resonance through capacitive coupling 830 between the conductive tip 210 and a channel electrode 821 of the coordinating measuring apparatus 100 according to the voltage change of the channel electrode 821.

The resonance circuit 220 in the coordinate indicating apparatus 200 may be simply configured of an inductor and a capacitor. The coordinate indicating apparatus may be implemented to change the resonance frequency of the pen according to the writing pressure in response to the capacitance of the capacitor of the resonance circuit 220 being changed according to the pressure that the conductive tip 210 presses the coordinate measuring apparatus 100. The contact writing pressure of the coordinate indicating apparatus may be measured by measuring the frequency of the second receiving signal received in the second receiver 145 of the coordinate measuring apparatus, and thus the change in the resonance frequency may be measured according the measured contact writing pressure.

One end of the resonance circuit 220 may be coupled to the ground unit 230, and the ground unit 230 may be coupled to the hand of the user through an outer case of the coordinate indicating apparatus.

Figure 22:
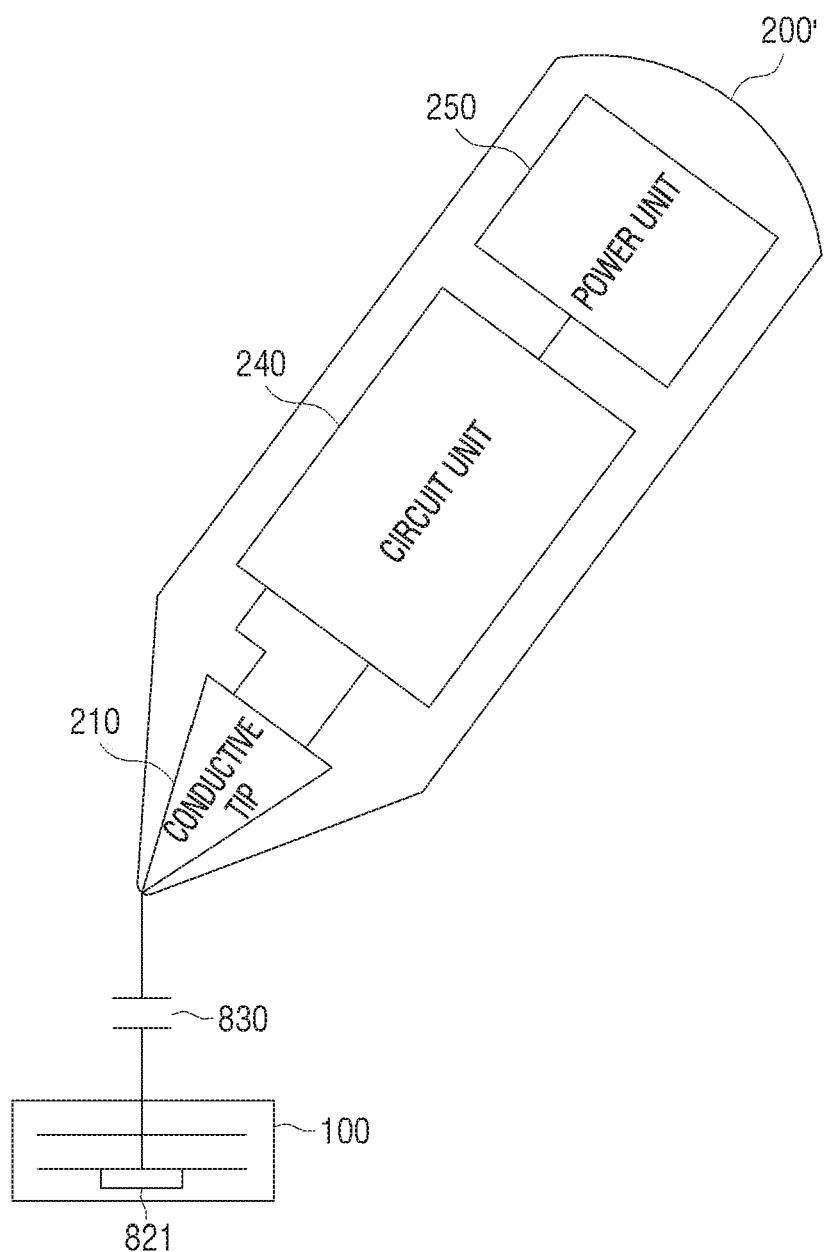
FIG. 22 is a diagram illustrating a detailed configuration of an active coordinate indicating apparatus according to an embodiment of the present disclosure.

FIG. 22 is a diagram illustrating a detailed configuration of an active coordinate indicating apparatus according to an embodiment of the present disclosure.

Referring to FIG. 22, a coordinate indicating apparatus 200' may include a conductive tip 210, a circuit unit 240, and a power unit 250. For example, the coordinate indicating apparatus 200' may be implemented, for example, in a pen form.

The conductive tip 210 may form capacitance with at least one among a plurality of electrodes in the coordinate measuring apparatus 100. The conductive tip 210 may be formed of, for example, a metallic tip. The conductive tip 210 may be formed in the inside of a non-conductive material or a portion of the conductive tip 210 may be exposed from the outside. The coordinate indicating apparatus may further include an insulating member which prevents the direct contact of the conductive tip with the outside to smooth the sense of handwriting in response to the coordinating indicating apparatus being used.

The conductive tip 210 may receive a trigger signal (or an excitation signal) from the coordinate measuring apparatus 100. The trigger signal may be a signal having a preset frequency and may have the same frequency as the first driving signal.

The circuit unit 240 may generate a response signal having a preset frequency and provide the generated response signal to the conductive tip 210. For example, the circuit unit 240 may generate the response signal having a specific frequency generated in an element therein according to power provided from the power unit 250. The circuit unit 240 may provide the generated response signal to the conductive tip 210. The response signal may be an electrical signal for measuring the contact position of the coordinate indicating apparatus 200' in the coordinate measuring apparatus 100.

The circuit unit 240 may detect the writing pressure in the conductive tip 210 and vary the frequency of the response signal according to the detected writing pressure. The circuit unit 240 may detect an operation mode of the coordinate indicating apparatus, generate the response signal having the frequency corresponding to the detected operation mode, and provide the generated response signal to the conductive tip 210.

The circuit unit 240 may generate the response signal for a preset time in response to the trigger signal being detected from the conductive tip 210. In response to the trigger signal being not detected within the preset time again, the circuit unit 240 may interrupt the generation of the response signal. The circuit unit 240 may control the configuration of the coordinate indicating apparatus 200' so that the coordinate indicating apparatus 200' maintains a power-saving state.

The power unit 250 may provide the power the circuit unit 240.

Figure 23:
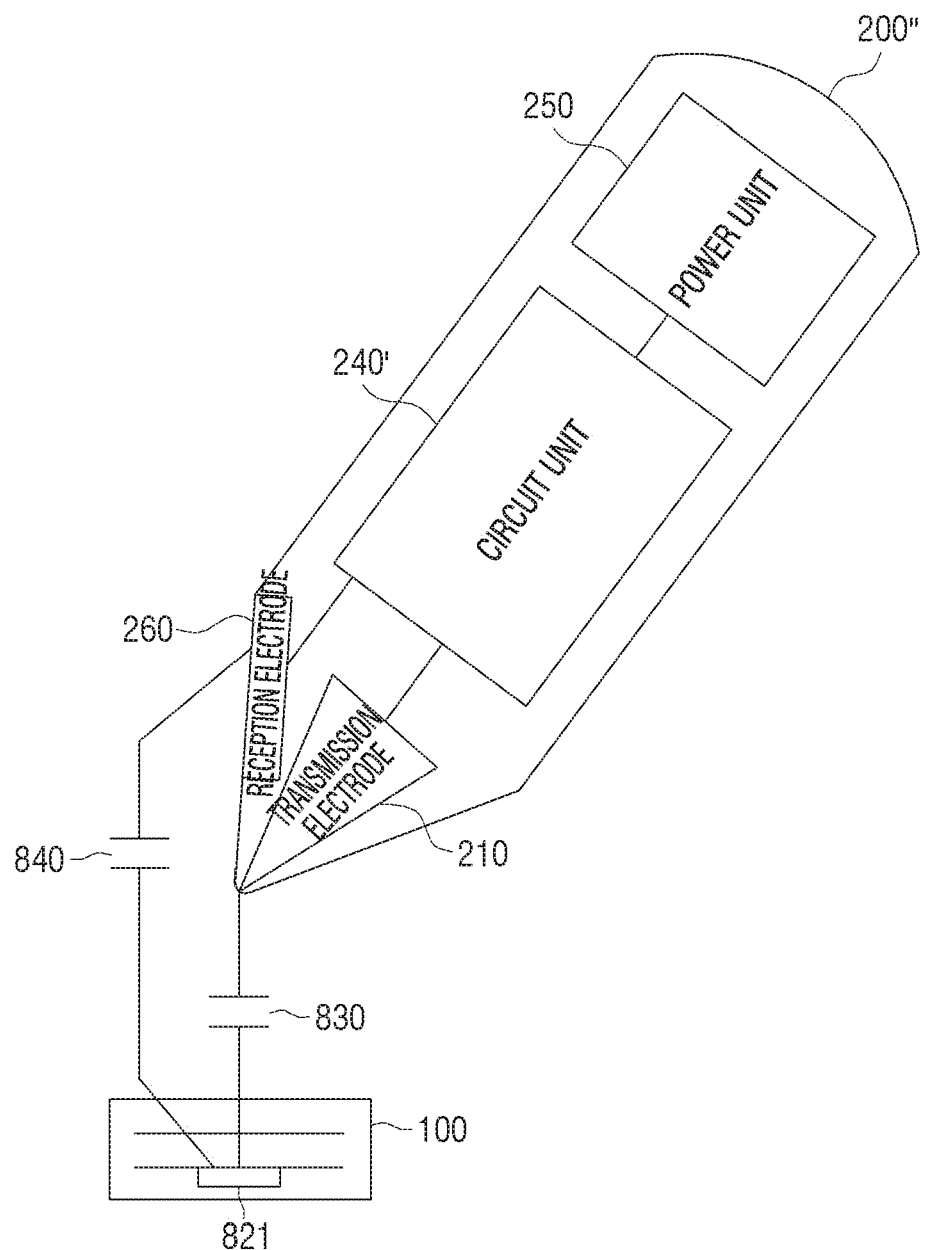
FIG. 23 is a diagram illustrating a detailed configuration of an active coordinate indicating apparatus according to an embodiment of the present disclosure.

FIG. 23 is a diagram illustrating a detailed configuration of an active coordinate indicating apparatus according to an embodiment of the present disclosure.

Referring to FIG. 23, a coordinate indicating apparatus 200" may include a transmission electrode 210, a reception electrode 260, a circuit unit 240', and a power unit 250. For example, the coordinate indicating apparatus 200" may be implemented, for example, in a pen form.

The transmission electrode 210 (or the conductive tip) may form capacitance with at least one among a plurality of electrodes in the coordinate measuring apparatus 100. The transmission electrode 210 may be formed of, for example, a metallic tip. The transmission electrode 210 may be formed in the inside of a non-conductive material or a portion of the transmission electrode 210 may be exposed from the outside. The coordinate indicating apparatus may further include an insulating member which prevents the direct contact of the transmission electrode 210 with the outside to smooth the sense of handwriting in response to the coordinating indicating apparatus being used.

The reception electrode 260 may form capacitance, for example, via capacitor 840, with at least one among the plurality of electrodes in the coordinate measuring apparatus 100. The reception electrode 260 may receive a trigger signal from the coordinate measuring apparatus 100.

The circuit unit 240' may generate a response signal having a preset frequency and provide the generated response signal to the conductive tip 210 (or transmission electrode). For example, the circuit unit 240' may generate the response signal having a specific frequency generated in an element therein according to power provided from the power unit 250. The circuit unit 240' may provide the generated response signal to the conductive tip 210 (or transmission electrode).

The circuit unit 240' may detect the writing pressure in the conductive tip 210 (or transmission electrode) and vary the frequency of the response signal according to the detected writing pressure. The circuit unit 240' may detect an operation mode of the coordinate indicating apparatus, generate the response signal having the frequency corresponding to the detected operation mode, and provide the generated response signal to the conductive tip 210 (or transmission electrode).

The circuit unit 240' may generate the response signal for a preset time in response to the trigger signal being detected from the reception electrode 260. In response to the trigger signal being not detected within the preset time again, the circuit unit 240' may interrupt the generation of the response signal or reduce a magnitude of the response signal. The circuit unit 240' may control the configuration of the coordinate indicating apparatus 200" so that the coordinate indicating apparatus 200" maintains a power-saving state.

The power unit 250 may provide the power to the circuit unit 240'.

Figure 24:
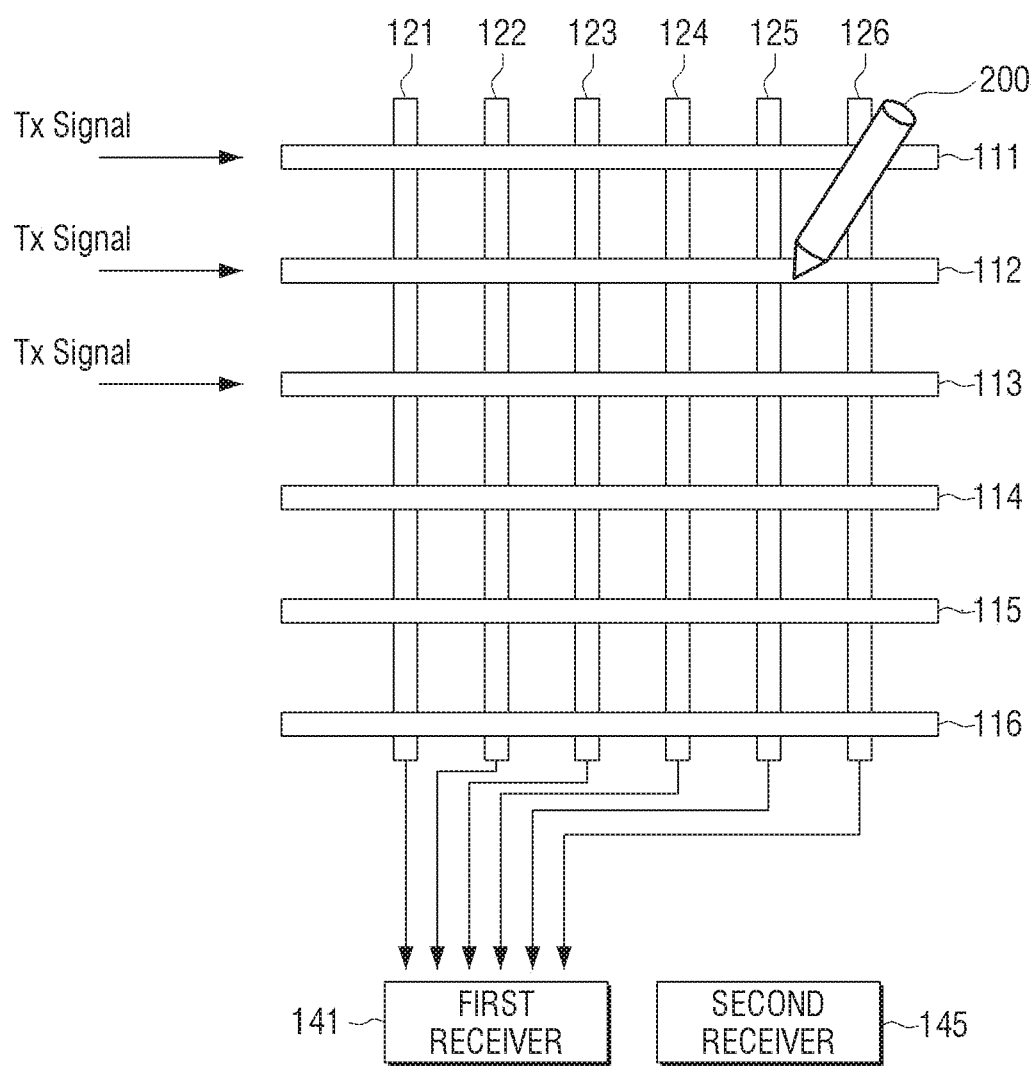
FIGS. 24 and 25 are diagrams illustrating an operation of a coordinate measuring apparatus according to various embodiments of the present disclosure.
Figure 25:
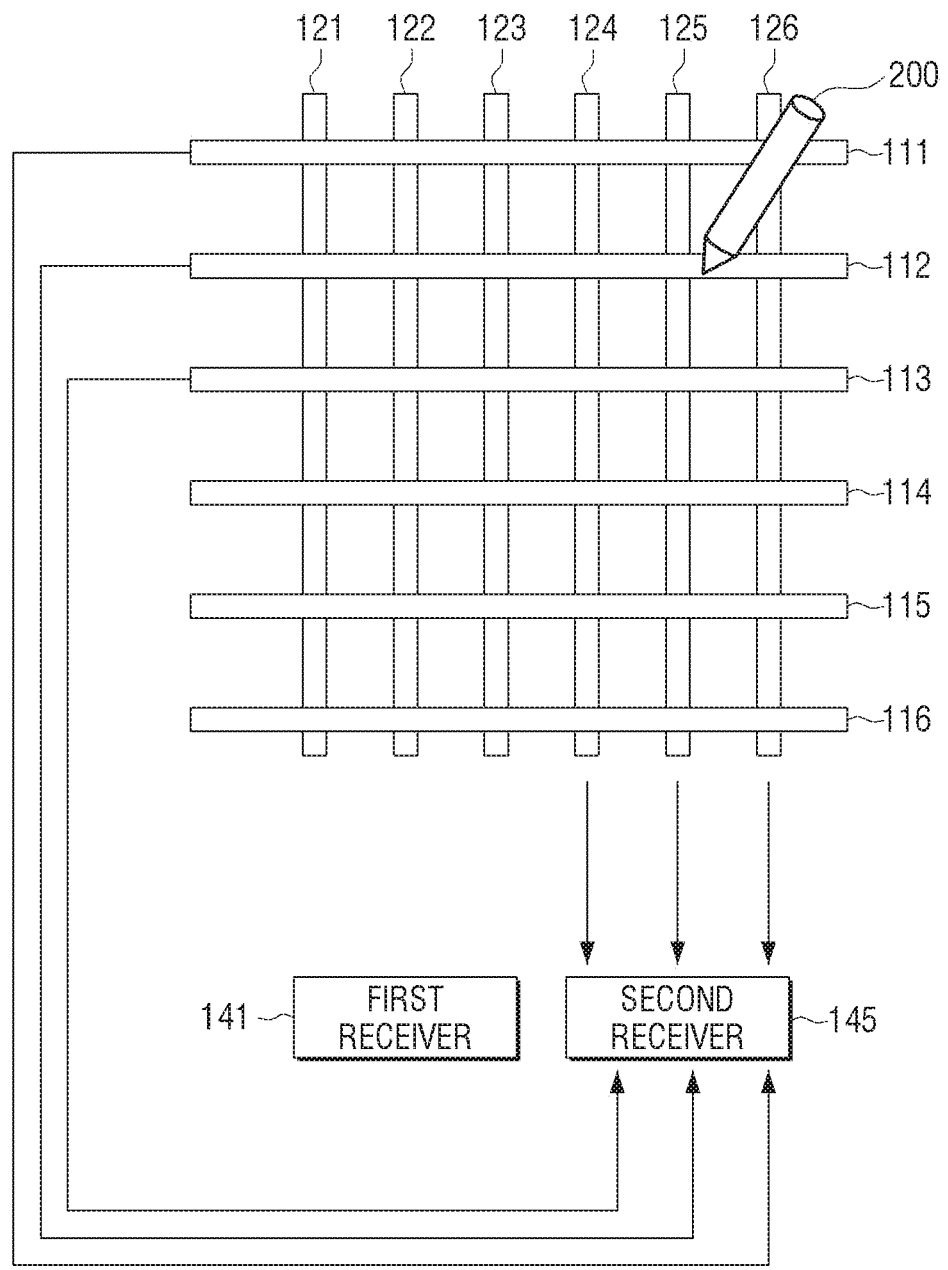

FIGS. 24 and 25 are diagrams illustrating an operation of a coordinate measuring apparatus according to various embodiments of the present disclosure. For example, the operation in the fifth embodiment may be an operation using the first driving signal as a trigger signal for wake-up of an active coordinate indicating apparatus.

Referring to FIG. 24, the driver (see 130 of FIG. 3) may apply the first driving signals Tx signal to the first sub group 111 to 113 of the first electrodes. For example, the first driving signals applied to the first electrodes may have different digital code values from each other.

The first receiver 141 may receive the first receiving signals from all the second electrodes 121 to 126 in a state that the first driving signals are applied.

The first driving signal may be used as the trigger signal, and the coordinate indicating apparatus 200 may generate the response signal by detecting the first driving signal.

Referring to FIG. 25, the second receiving signals corresponding to the response signal generated in the coordinate indicating apparatus 200' may be received in the second receiver 145.

Figure 26:
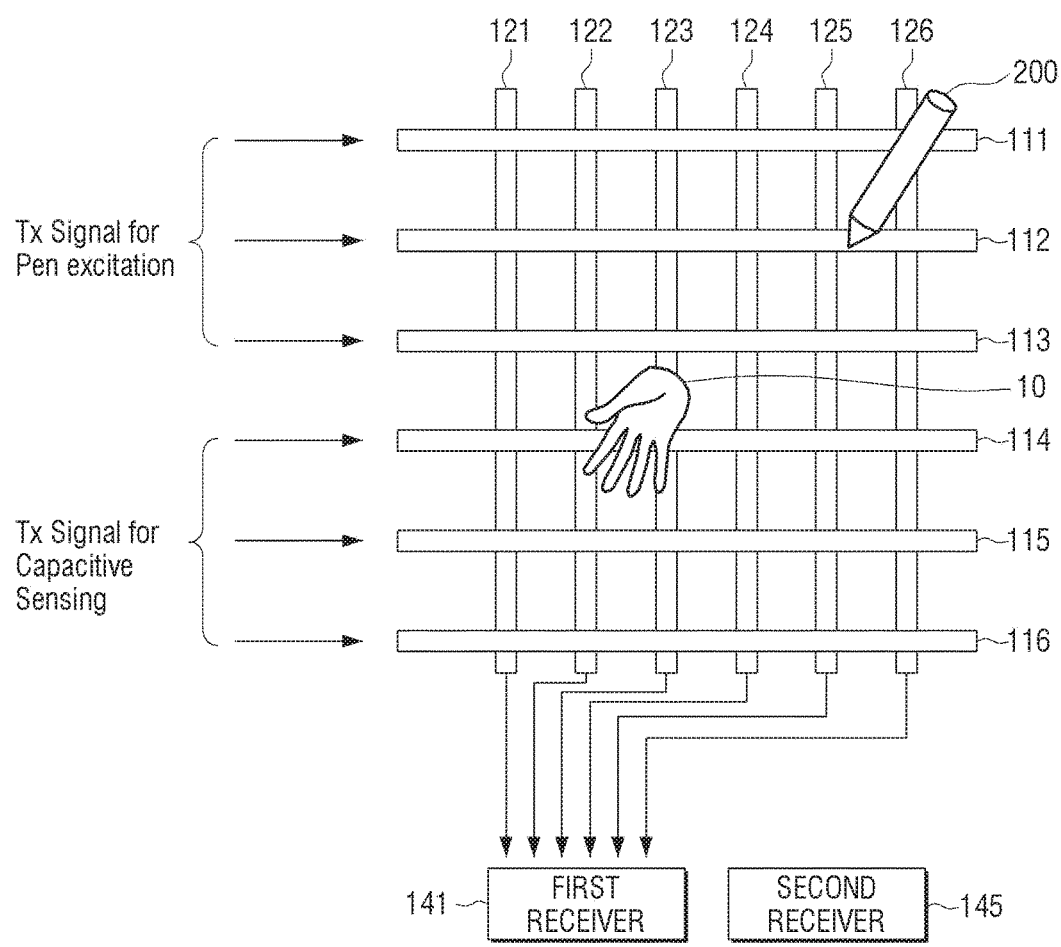
FIGS. 26 and 27 are diagrams illustrating an operation of a coordinate measuring apparatus according to various embodiments of the present disclosure.
Figure 27:
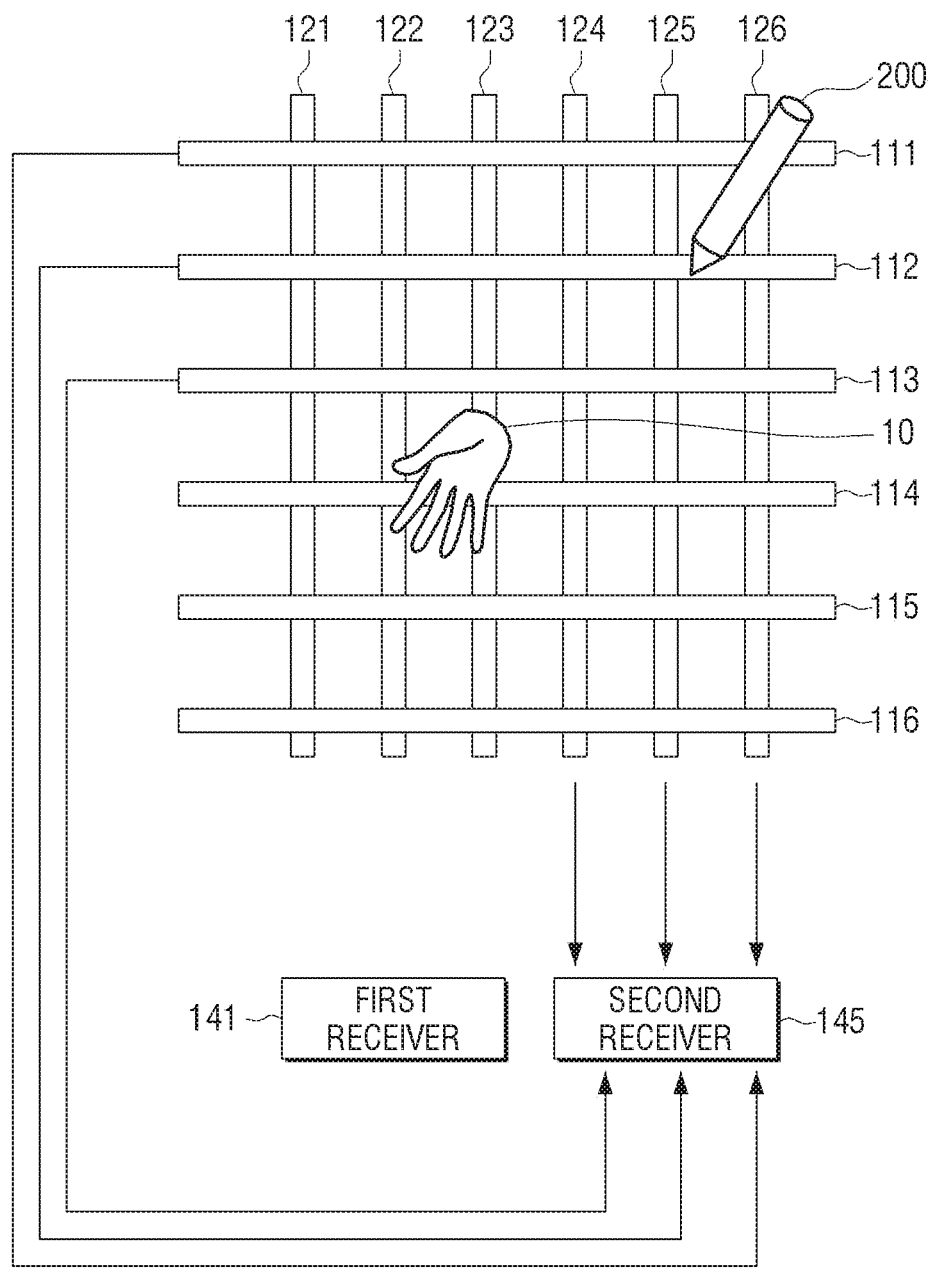

FIGS. 26 and 27 are diagrams illustrating an operation of a coordinate measuring apparatus according to various embodiments of the present disclosure. For example, the operation in the sixth embodiment may be an operation using a trigger signal for wake-up of an active coordinate indicating apparatus.

Referring to FIG. 26, the driver (see 130 of FIG. 3) may apply the first driving signals Tx signal to the second sub group 114 to 116 of the first electrodes. For example, the first driving signals applied to the first electrodes may have different digital code values from each other.

The driver 130 may apply the trigger signals for excitation of the active coordinate indicating apparatus to the first sub group 111 to 113 of the first electrodes.

The first receiver 141 may receive the first receiving signals from all the second electrodes 121 to 126 in a state that the first driving signals are applied.

The coordinate indicating apparatus 200' which detects the trigger signal may generate the response signal.

Referring to FIG. 27, the second receiving signals corresponding to the response signal generated in the coordinate indicating apparatus 200' may be received in the second receiver 145.

In FIG. 27, the response with respect to the trigger signal for excitation of the coordinate indicating apparatus 200' may be also introduced into the first receiver 141. The effect that the trigger signal affects the first receiving signal may be reduced in response to the driving frequency of the trigger signal and the driving frequency of the first driving signal being different from each other.

In another embodiment, the first driving signal for capacitive sensing may be encoded in a digital code such as a Hadamard code. In response to the encoding being used, the effect of the trigger signal in the first receiver 141 may be removed.

FIGS. 28 to 31 are waveform diagrams illustrating various driving methods of a coordinate indicating apparatus and a coordinate measuring apparatus according to various embodiments of the present disclosure.

Figure 28:
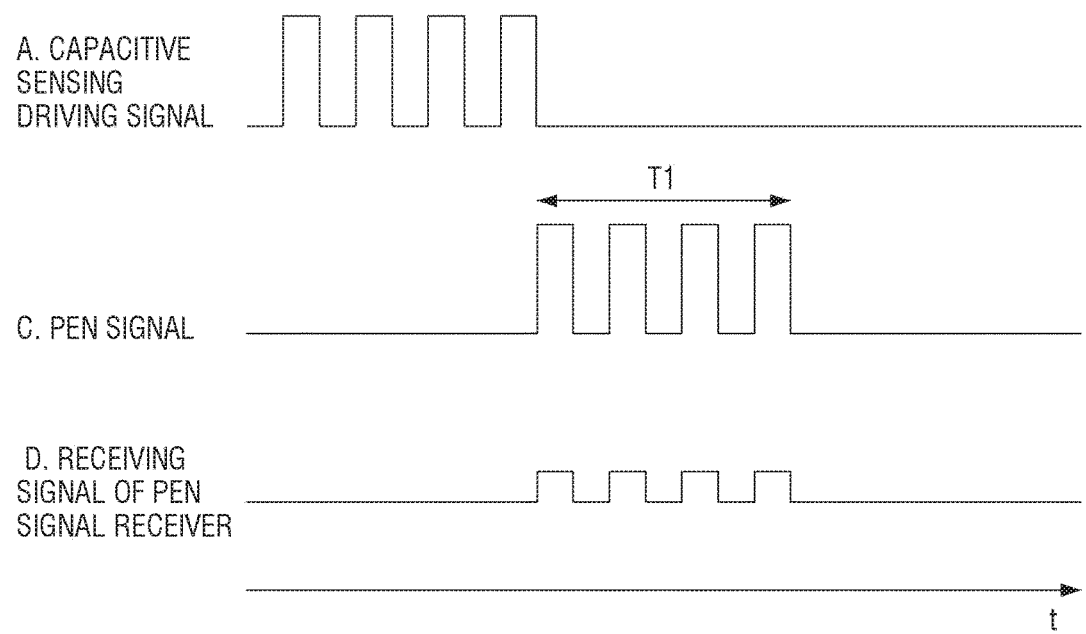
FIGS. 28 to 31 are waveform diagrams illustrating various driving methods of a coordinate indicating apparatus and a coordinate measuring apparatus according to various embodiments of the present disclosure.

Referring to FIG. 28, the driver 130 may apply a trigger signal for excitation of an active pen to a channel electrode (A. Capacitive sensing driving signal).

The coordinate indicating apparatus 200' may generate a response signal for a fixed period T1 (C. Pen signal) in response to the trigger signal being received.

As the response signal is generated, the second receiver 145 may receive a second receiving signal corresponding to the response signal generated in the coordinate indicating apparatus 200' (D. Receiving signal in Pen signal receiver).

In response to the coordinate indicating apparatus 200' being presented, since the coordinate measuring apparatus 100 understands that the response signal is to be received for the fixed period T1 after the trigger signal is applied, the coordinate measuring apparatus 100 may receive the second receiving signal corresponding to the response signal through the second receiver 145.

Figure 29:
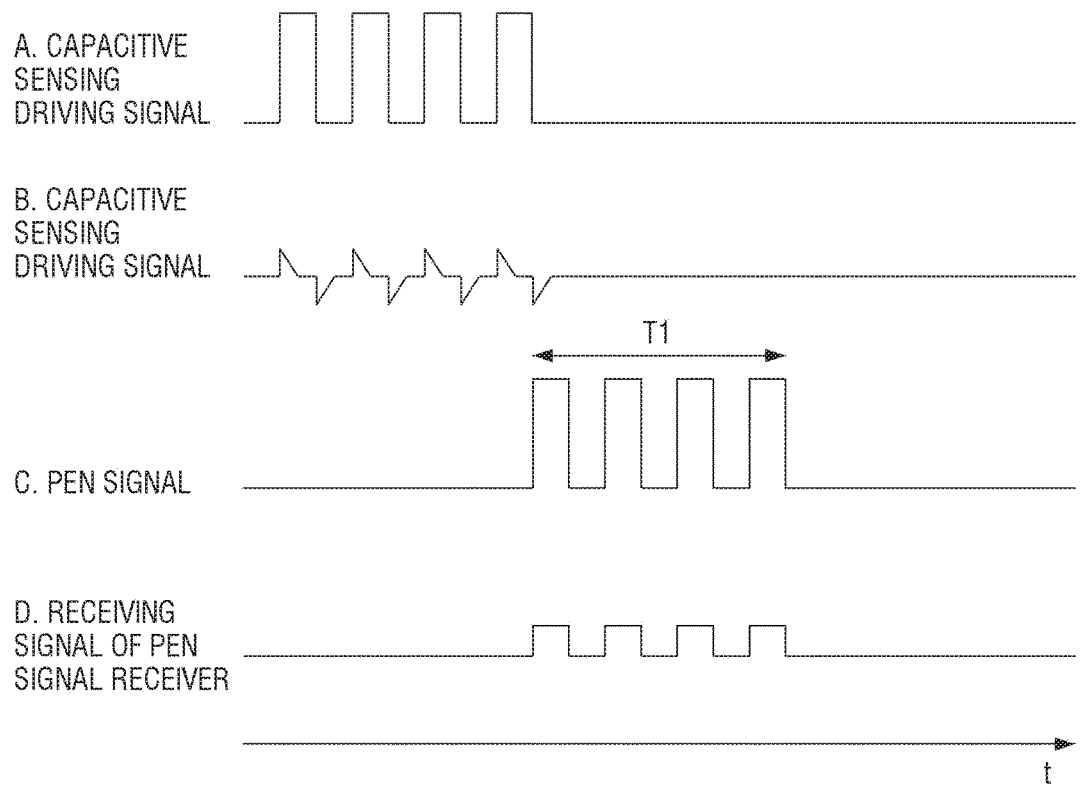

Referring to FIG. 29, the driver 130 may apply the first driving signal for capacitive sensing to the channel electrode (A. Capacitive sensing driving signal).

The first receiver 141 may receive the first receiving signal for capacitive sensing from an electrode crossing the channel electrode to which the first driving signal is applied (B. Capacitive sensing receiving signal).

In response to the providing of the first driving signal for capacitive sensing being completed, the coordinate indicating apparatus 200' may generate the response signal for the fixed period T1 (C. Pen signal). That is, the driver 130 may use the first driving signal as the trigger signal other than a separate trigger signal.

In the embodiment, the circuit configuration of the coordinate measuring apparatus 100 may be simplified since the separate driving signal for excitation of the coordinate indicating apparatus is not necessary.

The coordinate indicating apparatus 200' may generate the response signal according to the excitation signal (for example, the trigger signal or the first driving signal) of the coordinate measuring apparatus 100. However, in response to the timing that the response signal is generated overlapping the period that the first driving signal is applied, the sensitivity of the capacitive sensing may be degraded.

Figure 30:
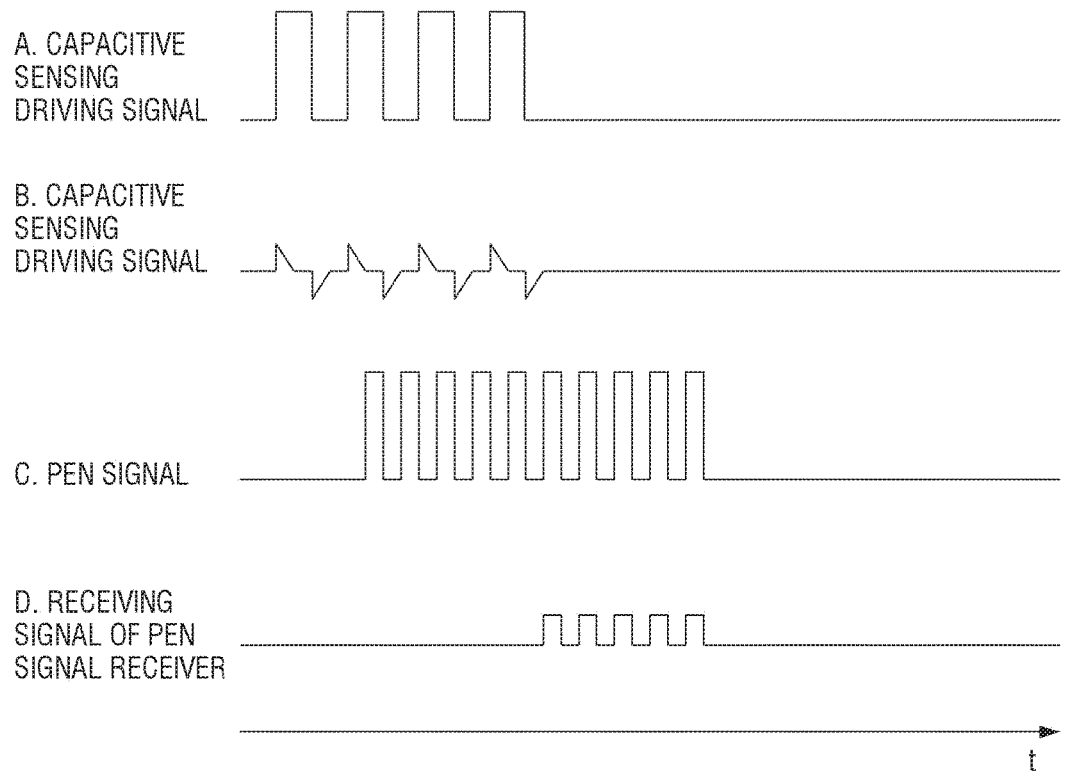
Figure 31:
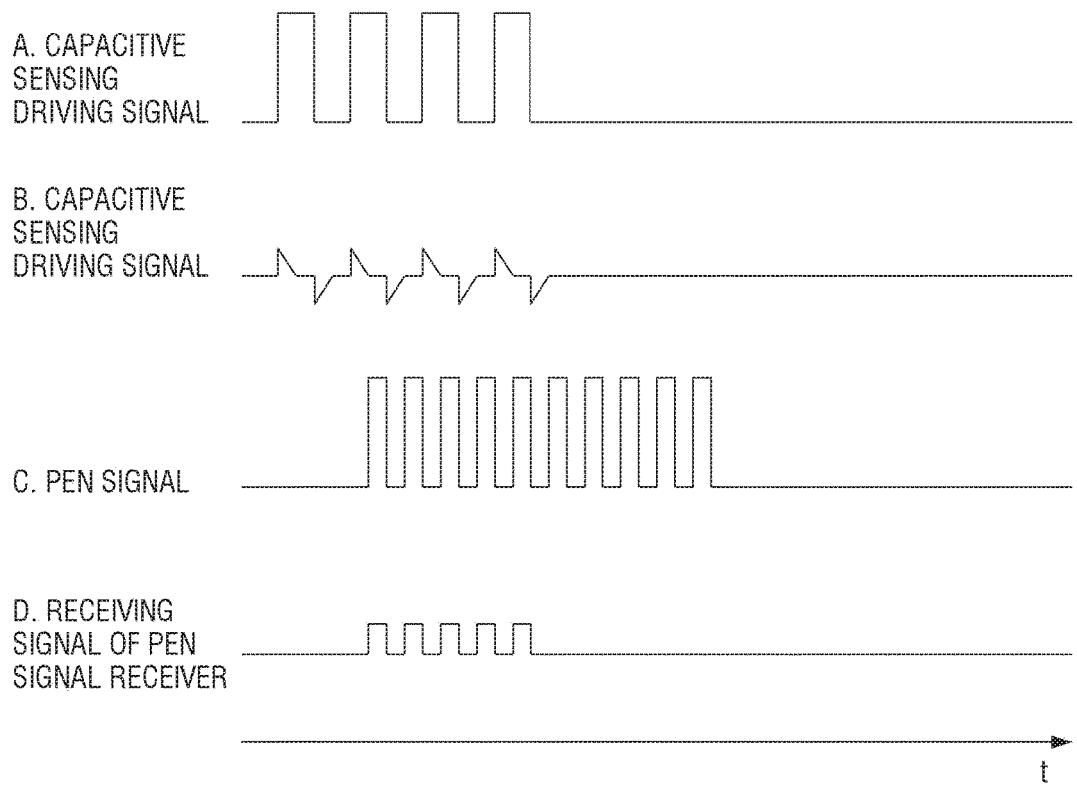

To overcome the degradation in the sensitivity of the capacitive sensing, as illustrated in FIGS. 30 and 31, the frequency of the response signal generated in the coordinate indicating apparatus may be different from the frequency of the first driving signal for capacitive sensing. Accordingly, the degradation in the sensitivity of the capacitive sensing may be prevented even in response to the generation period of the response signal overlapping the application period of the first driving signal.

In another embodiment, the Hadamard code may be used as described above.

Figure 32:
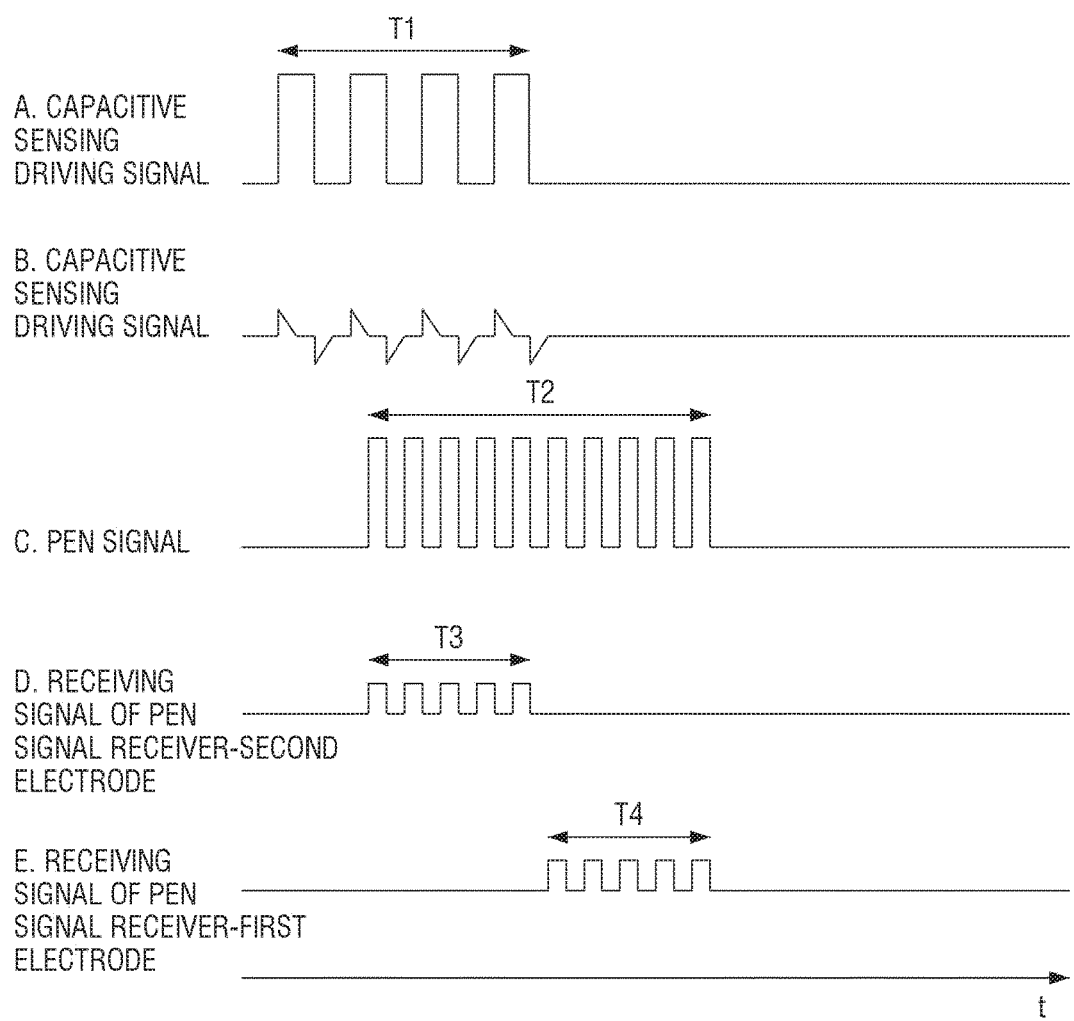
FIGS. 32 to 34 are diagrams illustrating an operation of a coordinate measuring apparatus according to various embodiments of the present disclosure.
Figure 33:
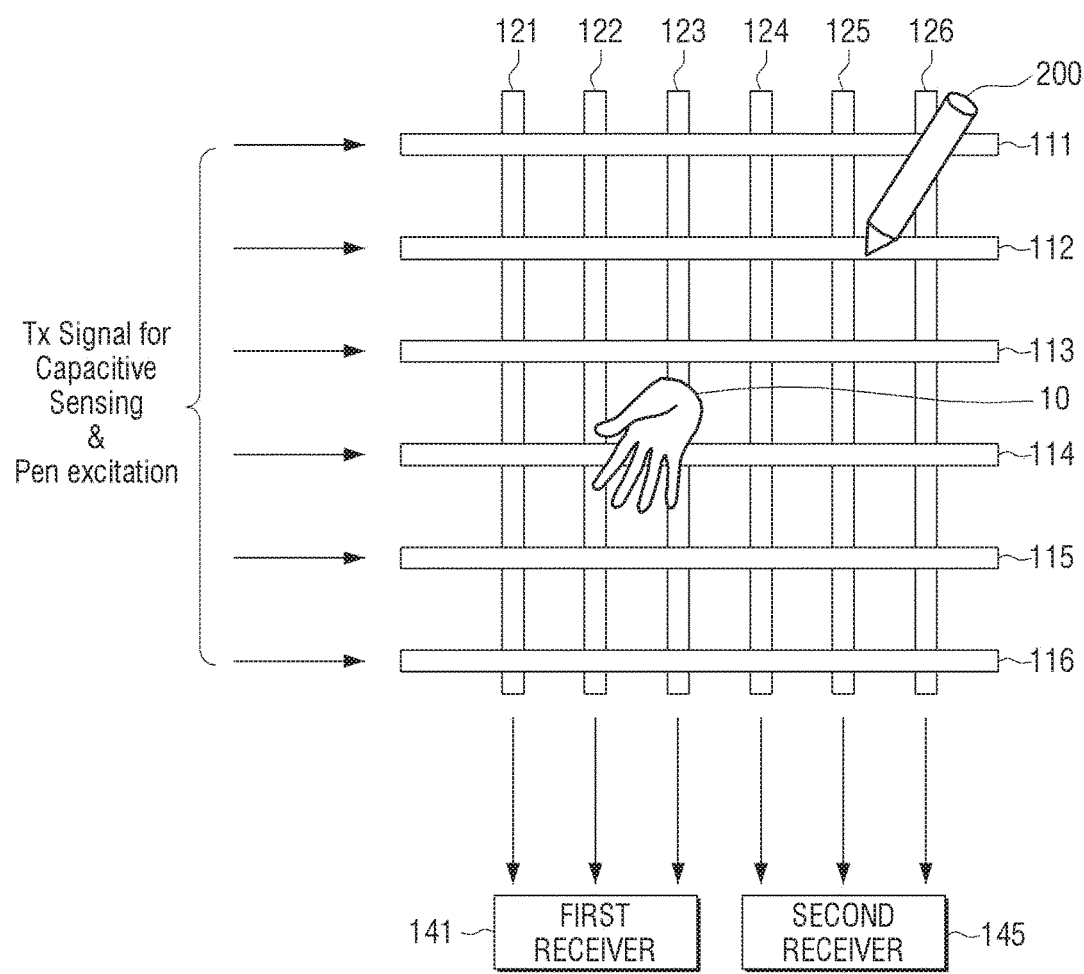
Figure 34:
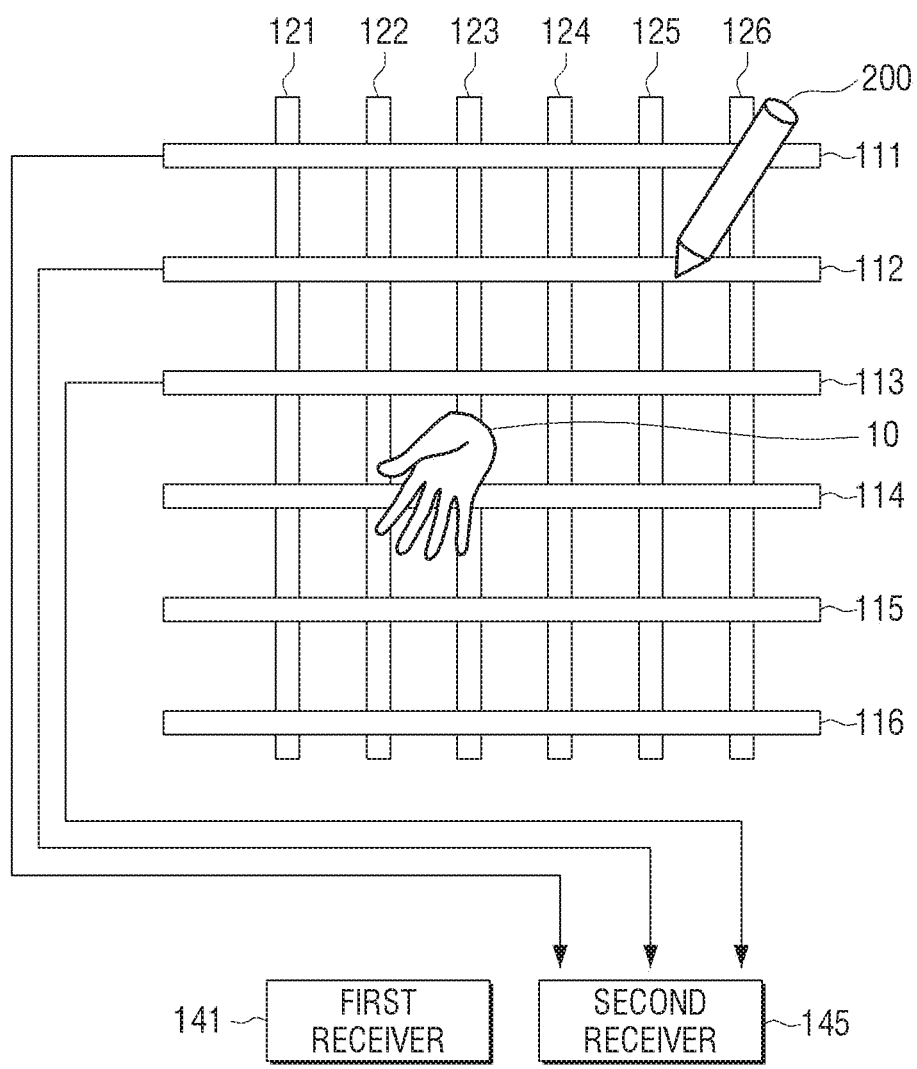

FIGS. 32 to 34 are diagrams illustrating an operation of a coordinating measuring apparatus according to various embodiments of the present disclosure.

Referring to FIGS. 32 and 33, the driver 130 may apply the first driving signals for capacitive sensing to the first electrodes for a fixed period T1 (A. Capacitive sensing driving signal).

In response to the first driving signals being applied, the first receiver 141 may receive the first receiving signals from the second electrodes 121 to 123 crossing the first electrodes to which the first driving signals are applied (B. Capacitive sensing receiving signal).

The coordinate indicating apparatus 200' may be excited by the first driving signals and generate the response signal for a fixed time (C. pen signal).

The second receiver 145 may receive the second receiving signals corresponding to the response signal from the second electrodes 124 to 126 for a preset time (T3 period).

Referring to FIGS. 32 and 34, the second receiver 145 may receive the second receiving signals corresponding to the response signal from the first electrodes 111 to 113 for a preset time (T4 period).

Figure 35:
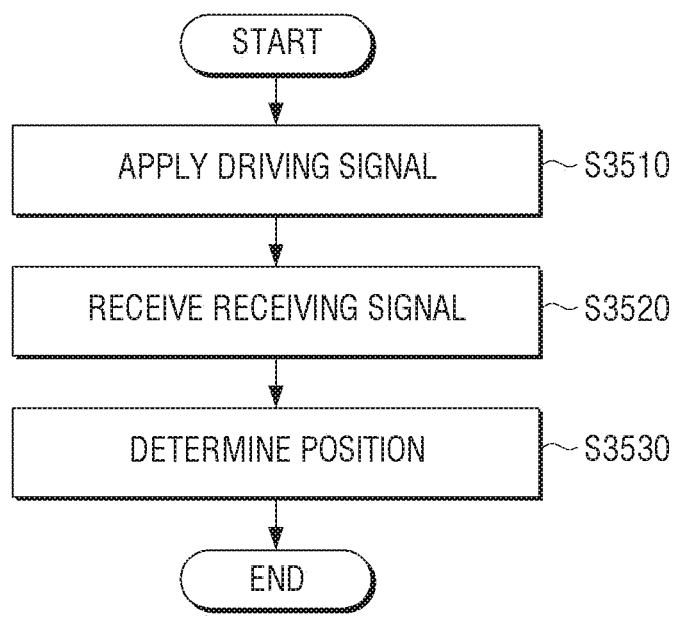
FIG. 35 is a flowchart illustrating a coordinate measuring method of a coordinate measuring apparatus according to an embodiment of the present disclosure.

FIG. 35 is a flowchart illustrating a coordinate measuring method of a coordinate measuring apparatus according to an embodiment of the present disclosure.

Referring to FIG. 35, first driving signals may be applied to first electrodes arranged in a first direction among a plurality of electrodes in a channel electrode unit in units of a plurality of electrodes at operation S3510. The first driving signal may be a signal having a different frequency band from a response signal received from the coordinate indicating apparatus 200 to be described and may have a digital code. That is, the driving signals having different digital codes may be applied to the plurality of first electrodes.

In response to the coordinate indicating apparatus 200 being a stylus pen operating a passive manner, the coordinate measuring apparatus 200 may apply the second driving signals to a plurality of electrodes in the channel electrode unit. The second driving signal may have a different frequency band from the first driving signal and may be applied to the plurality of electrodes together with the first driving signal. The second driving signal may be applied in advance before the first driving signal is applied or the second driving signal and the first driving signal may be simultaneously applied. For example, the first driving signals may be applied to a first sub group of the first electrodes and the second driving signals may be applied to a second sub group of the first electrodes.

The coordinate measuring apparatus may receive the first receiving signals for detection of capacitance change from a portion of the plurality of electrodes and simultaneously receive the second receiving signals corresponding to the response signal transmitted from the coordinate indicating apparatus from the other portion of the plurality of electrodes at operation S3520. For example, the first receiving signals may be received from the plurality of second electrodes in units of a plurality of channels. Amplification and various signal processing on the received first receiving signals may be performed.

The coordinate measuring apparatus may receive the second receiving signals from electrodes which the first receiving signals are not received therefrom or which are not used to apply the first driving signals among the plurality of first electrodes and the plurality of second electrodes in units of a plurality of channels. Filtering and various signal processing on the received second receiving signals may be performed.

The coordinate measuring apparatus may determine a position of at least one of the hand and the coordinate indicating apparatus based on the received first receiving signals and second receiving signals at operation S3530. For example, the coordinate measuring apparatus may calculate capacitance between electrodes at each of a plurality of electrode crossing points formed between the first electrodes and the second electrodes using the first receiving signals and the second electrodes using the first receiving signal and determine the position of the hand based on the calculated capacitance.

The coordinate measuring apparatus may determine the position of the coordinate indicating apparatus based on a ratio between the second receiving signals received from the first electrodes and a ratio between the second receiving signals received from the second electrodes.

As described above, the coordinate measuring method of the coordinate measuring apparatus according to the various embodiments may simultaneously measure the position of the hand and the position of the stylus pen at high speed by simultaneously receiving the first receiving signals for detecting the position of the hand and the second receiving signals for detecting the position of the stylus pen. The coordinate measuring method of the coordinate measuring apparatus according to the various embodiments may perform various signal processing on the receiving signals to improve the receiving sensitivity for the response signal. The coordinate measuring method illustrated in FIG. 35 may be executed on the coordinate measuring apparatus having the configuration of FIG. 2. The coordinate measuring method illustrated in FIG. 35 may be executed on other coordinate measuring apparatuses having other configurations.

The above-described coordinate measuring method may be implemented with a program executable in the processor of FIG. 2, and the program may be stored in a non-transitory computer-readable medium and provided.

The non-transitory computer-readable medium is not a medium configured to temporarily store data such as a register, a cache, or a memory but an apparatus-readable medium configured to permanently or semi-permanently store data.

Figure 36:
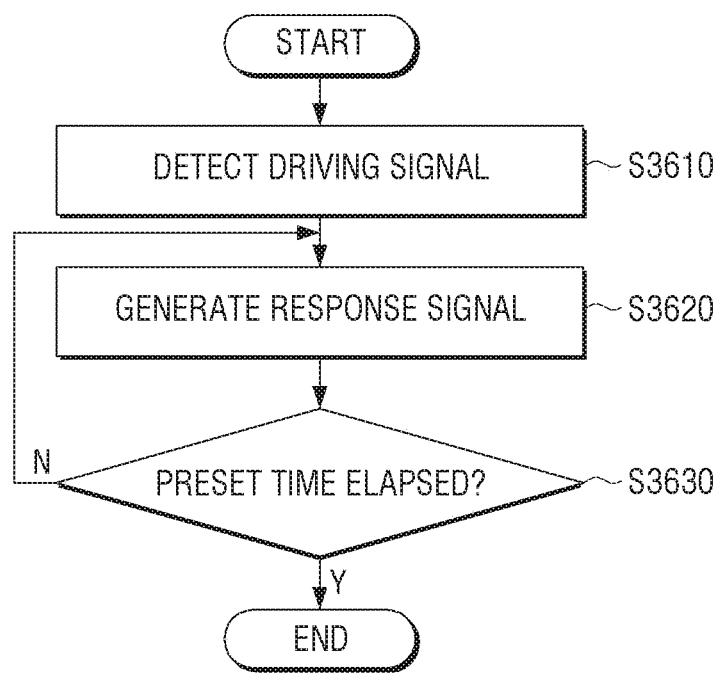
FIG. 36 is a flowchart illustrating a control method of a coordinate indicating apparatus according to an embodiment of the present disclosure.

FIG. 36 is a flowchart illustrating a control method of a coordinate indicating apparatus according to an embodiment of the present disclosure.

Referring to FIG. 36, the coordinate indicating apparatus 200 may have a power-saving mode in which a response signal is not generated and an operation mode in which the response signal is generated.

The coordinate indicating apparatus 200 in the power-saving mode may detect a driving signal at operation S3610. The driving signal may be the first driving signal for detecting the position of the hand in the coordinate measuring apparatus 100.

In response to the driving signal being detected, the coordinate indicating apparatus may generate a response signal having a preset resonance frequency and emit the generated response signal through a conductive tip at operation S3620. That is, in response to the driving signal being detected, the coordinate indicating apparatus 200 may convert a mode from the power-saving mode to the operation mode. The frequency of the generated response signal may be varied according to contact pressure of the conductive tip and a mode state (for example, a writing mode or an eraser mode).

In response to a preset time being elapsed after the driving signal is received, the coordinate indicating apparatus 200 may convert the mode to the power-saving mode. That is, the coordinate indicating apparatus may terminate the generation and emission operations of the response signal in the power-saving mode. A method of reducing power consumption by reducing a magnitude of the response signal may also be applied.

As described above, the control method of the coordinate indicating apparatus according to the various embodiment may automatically control turn-on/off of the response signal according to the detection of the driving signal, and thus save the power of the coordinate indicating apparatus operating in an active manner. The control method illustrated in FIG. 36 may be executed on the coordinate indicating apparatus having the configuration of FIG. 22 or 23. The control method illustrated in FIG. 35 may be executed on other coordinate indicating apparatuses having other configurations.

The above-described control method may be implemented with a program executable in the coordinate indicating apparatus, and the program may be stored in a non-transitory computer-readable medium and provided.

The non-transitory computer-readable medium is not a medium configured to temporarily store data such as a register, a cache, or a memory but an apparatus-readable medium configured to permanently or semi-permanently store data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A coordinate measuring apparatus comprising:
   a channel electrode circuit including a plurality of electrodes;
   a driver circuit configured to generate a driving signal and provide the driving signal to the channel electrode circuit;
   a receiver configured to:
      receive a first receiving signal for detecting capacitance change from a portion of the plurality of electrodes, and
      simultaneously receive a second receiving signal corresponding to a signal transmitted from a coordinate indicating apparatus from another portion of the plurality of electrodes; and
   a processor configured to:
      determine a position of a hand based on the first receiving signal, or
      determine a position of the coordinating indicating apparatus based on the second receiving signal.

2. The coordinate measuring apparatus of claim 1, wherein the driver circuit is further configured to:
   generate the driving signal having a different frequency band from the second receiving signal, and
   provides the driving signal to the channel electrode circuit.

3. The coordinate measuring apparatus of claim 1, wherein the channel electrode circuit includes:
   a first electrode group including a plurality of first electrodes arranged in a first direction; and
   a second electrode group including a plurality of second electrodes arranged in a second direction perpendicular to the first direction,
   wherein the receiver is further configured to receive the second receiving signal from the second electrode group while the driver circuit is further configured to drive the first electrode group to generate the first receiving signal.

4. The coordinate measuring apparatus of claim 3, wherein the processor is further configured to:
   calculate a capacitance between electrodes at each of a plurality of electrode crossing points using the first receiving signal,
   determine the position of the hand based on the calculated capacitance, and
   determine the position of the coordinate indicating apparatus based on a ratio between second receiving signals received from each of the plurality of second electrodes of the second electrode group.

5. The coordinate measuring apparatus of claim 1, wherein the channel electrode circuit includes:
   a first electrode group including a plurality of first electrodes arranged in a first direction; and
   a second electrode group including a plurality of second electrodes arranged in a second direction perpendicular to the first direction, and
   wherein while the driver circuit is further configured to drive a portion of the plurality of first electrodes in the first electrode group to generate the first receiving signal, the receiver is further configured to receive the second receiving signal from another portion of the plurality of first electrodes in the first electrode group.

6. The coordinate measuring apparatus of claim 5, wherein the first receiving signal and the second receiving signal are signals having different frequency bands from each other.

7. The coordinate measuring apparatus of claim 1,
   wherein the receiver is further configured to receive the first receiving signal and the second receiving signal in parallel in units of a plurality of channels, and
   wherein the processor is further configured to control the receiver to simultaneously receive the first receiving signal and the second receiving signal from different electrodes.

8. The coordinate measuring apparatus of claim 1,
   wherein the driver circuit is further configured to generate a first driving signal for generating the first receiving signal and a second driving signal for generating a signal of the coordinate indicating apparatus approaching the coordinating measuring apparatus through capacitive coupling, and
   wherein the first driving signal and the second driving signal are signals having different frequency bands from each other.

9. The coordinate measuring apparatus of claim 8, wherein the driver circuit is further configured to provide the first driving signal and the second driving signal to different electrodes.

10. The coordinate measuring apparatus of claim 8, wherein the second driving signal is a signal in which higher-order harmonics of a signal frequency are filtered.

11. The coordinate measuring apparatus of claim 1, wherein the receiver further includes:
   a first receiver configured to receive the first receiving signal for detecting the capacitance change; and
   a second receiver configured to receive the second receiving signal corresponding to the signal transmitted from the coordinate indicating apparatus while the first receiving signal is received.

12. The coordinate measuring apparatus of claim 11, wherein the second receiver further includes:
an amplifier configured to:
amplify the received second receiving signal, and output an amplified second receiving signal;
an analog to digital converter (ADC) configured to convert the amplified second receiving signal to a digital signal; and
a signal processor configured to extract a preset frequency component from the converted digital signal.

13. The coordinate measuring apparatus of claim 11, wherein the second receiver further includes:
a filter configured to perform filtering on a preset frequency band of the received second receiving signal; and
a signal processor configured to:
measure a magnitude of the filtered second receiving signal, and
extract writing pressure information using a frequency band of the filtered second receiving signal.

14. A coordinate measuring apparatus which detects a contact position of a hand based on capacitance and detect a contact position of a coordinate indicating apparatus configured to generate an electrical signal for measuring the contact position, the coordinate measuring apparatus comprising:
a channel electrode circuit including a plurality of electrodes;
a driver circuit configured to generate a driving signal and provide the driving signal to the channel electrode circuit;
a receiver configured to simultaneously a receive first receiving signal for detecting capacitance change and a second receiving signal corresponding to the electrical signal generated in the coordinate indicating apparatus from electrodes of the channel electrode circuit; and
a processor configured to determine a position of the hand based on the first receiving signal, or
determine a position of the coordinate indicating apparatus based on the second receiving signal received from the receiver,
wherein the driver circuit is further configured to generate:
a first driving signal for detecting the capacitance change and a second driving signal which is an excitation signal for generating the electrical signal of the coordinate indicating apparatus, and
apply the first driving signal and the second driving signal to different electrodes.

15. The coordinate measuring apparatus of claim 14, wherein the first driving signal and the second driving signal are signals having different frequency bands from each other.

16. The coordinate measuring apparatus of claim 14, wherein the driver circuit is further configured to provide first driving signals having different digital codes according to electrodes.

17. A coordinate measuring system comprising:
a coordinate measuring apparatus including a plurality of electrodes and a receiver; and
a coordinate indicating apparatus configured to transmit a response signal to at least one of the plurality of electrodes in the coordinate measuring apparatus,
wherein the coordinate measuring apparatus is configured to generate a driving signal,
wherein the receiver is configured to:
receive a first receiving signal for detecting capacitance change from a portion of the plurality of electrodes, and
simultaneously receive a second receiving signal corresponding to a signal generated by coordinate indicating apparatus from another portion of the plurality of electrodes, and
wherein the coordinate indicating apparatus is further configured to generate the response signal for a preset time in response to the driving signal being detected through capacitive coupling.

18. The coordinate measuring system of claim 17, wherein the response signal and the driving signal are signals having different frequency bands from each other.

19. The coordinate measuring system of claim 17, wherein the coordinate indicating apparatus is further configured to generate the response signal for the preset time after detection of the driving signal is terminated.

20. The coordinate measuring system of claim 17, wherein the receiver of the coordinate measuring apparatus further includes:
a first signal receiver configured to receive the first receiving signal; and
a second signal receiver configured to receive the second receiving signal for detecting the response signal,
wherein the first signal receiver and the second signal receiver are further configured to simultaneously receive the first receiving signal and the second receiving signal from different electrodes among the plurality of electrodes.

* * * * *